United States Patent
Hayashi

(10) Patent No.: US 12,153,317 B2
(45) Date of Patent: Nov. 26, 2024

(54) DISPLAY DEVICE HAVING GAP BETWEEN PIXEL ELECTRODES WITHOUT SCAN LINE

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/220,358

(22) Filed: Jul. 11, 2023

(65) Prior Publication Data

US 2024/0019743 A1 Jan. 18, 2024

(30) Foreign Application Priority Data

Jul. 12, 2022 (JP) ................................ 2022-111670

(51) Int. Cl.
*G02F 1/1362* (2006.01)
*G02F 1/1368* (2006.01)

(52) U.S. Cl.
CPC .. *G02F 1/136286* (2013.01); *G02F 1/136209* (2013.01); *G02F 1/1368* (2013.01)

(58) Field of Classification Search
CPC ......... G02F 1/136286; G02F 1/136209; G02F 1/1368
See application file for complete search history.

(56) References Cited

U.S. PATENT DOCUMENTS

| | | | |
|---|---|---|---|
| 2019/0011747 | A1* | 1/2019 | Shimoshikiryoh ... G02F 1/1343 |
| 2020/0127011 | A1* | 4/2020 | Yamazaki ......... H01L 29/78666 |
| 2021/0280611 | A1 | 9/2021 | Yamazaki et al. |
| 2022/0004052 | A1 | 1/2022 | Ohue |

FOREIGN PATENT DOCUMENTS

| | | |
|---|---|---|
| JP | 2020-160254 A | 10/2020 |
| WO | WO2018/130920 A1 | 7/2018 |

* cited by examiner

*Primary Examiner* — Lauren Nguyen
(74) *Attorney, Agent, or Firm* — K&L Gates LLP

(57) ABSTRACT

According to an aspect, a display device includes: a first light-transmitting substrate; a second light-transmitting substrate; a liquid crystal layer disposed between the first light-transmitting substrate and the second light-transmitting substrate and includes polymer-dispersed liquid crystals; scan lines that are provided to the first light-transmitting substrate and extend along a first direction; signal lines that extend in a second direction intersecting the first direction; a first pixel electrode and a second pixel electrode that are arranged in the second direction; and a first switching element electrically coupled to the first pixel electrode and a second switching element electrically coupled to the second pixel electrode. One of the scan lines is arranged between the first pixel electrode and the second pixel electrode in the second direction and is electrically coupled to the first switching element of the first pixel electrode and the second switching element of the second pixel electrode.

12 Claims, 25 Drawing Sheets

DISPLAY DEVICE HAVING GAP BETWEEN PIXEL ELECTRODES WITHOUT SCAN LINE

CROSS-REFERENCE TO RELATED APPLICATION

This application claims the benefit of priority from Japanese Patent Application No. 2022-111670 filed on Jul. 12, 2022, the entire contents of which are incorporated herein by reference.

BACKGROUND

1. Technical Field

What is disclosed herein relates to a display device.

2. Description of the Related Art

Japanese Patent Application Laid-open Publication No. 2020-160254 (JP-A-2020-160254) describes a display device that includes an array substrate, a counter substrate disposed so as to face the array substrate, a liquid crystal layer that is provided between the array substrate and the counter substrate and includes polymer-dispersed liquid crystals, and a light source disposed so as to emit light into a side surface of the array substrate or a side surface of the counter substrate. In the display device described in JP-A-2020-160254, a viewer on one surface side of a display panel can view a background on the other surface side opposite to the one surface side. International Patent Application Publication No. WO2018/130920 (WO2018/130920) discloses a wiring layout suitable for large-sized liquid crystal display devices.

In a display device of JP-A-2020-160254, the light that has entered from the side surface of the array substrate or the side surface of the counter substrate travels through the display panel while repeating reflection. The array substrate is provided with a scan line and a signal line for each of pixels arranged in a matrix having a row-column configuration. Therefore, the light reflected or scattered by the wiring provided in the array substrate may be reflected or scattered and emitted from a display surface as unintended light different from an image to be displayed. WO2018/130920 does not describe what is called a transparent display that is configured such that a viewer on one surface side of a display panel can view a background on the other surface side opposite to the one surface side.

SUMMARY

According to an aspect, a display device includes: a first light-transmitting substrate; a second light-transmitting substrate that faces the first light-transmitting substrate; a liquid crystal layer that is disposed between the first light-transmitting substrate and the second light-transmitting substrate and includes polymer-dispersed liquid crystals; a plurality of scan lines that are provided to the first light-transmitting substrate and extend along a first direction; a plurality of signal lines that extend in a second direction intersecting the first direction; a first pixel electrode and a second pixel electrode that are arranged in the second direction; and a first switching element electrically coupled to the first pixel electrode and a second switching element electrically coupled to the second pixel electrode. One of the scan lines is arranged between the first pixel electrode and the second pixel electrode in the second direction and is electrically coupled to the first switching element of the first pixel electrode and the second switching element of the second pixel electrode.

DETAILED DESCRIPTION

Figure 1:
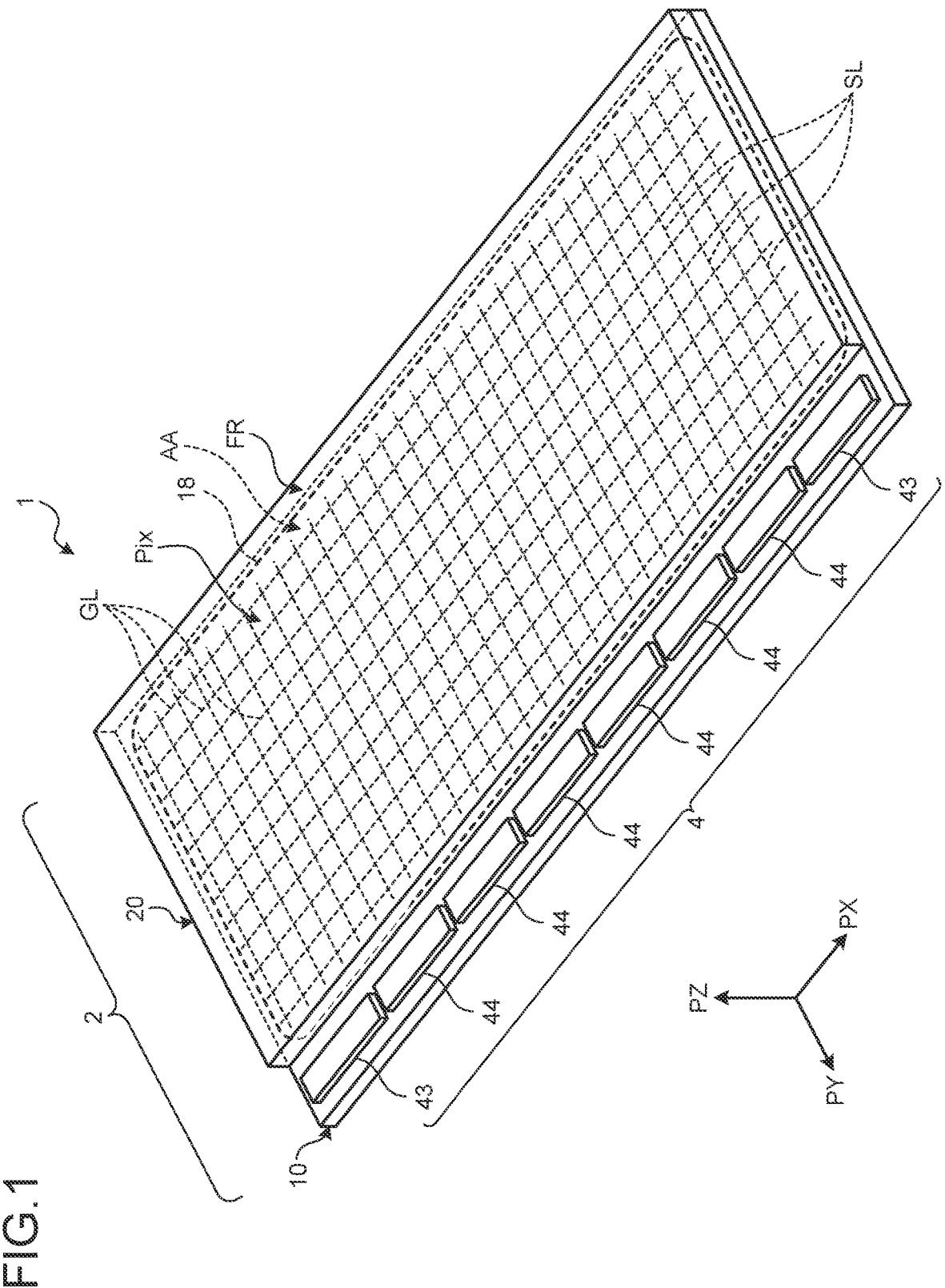
FIG. 1 is a perspective view illustrating an example of a display panel according to the present embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the present disclosure and the drawings, and detailed description thereof will not be repeated in some cases where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

Figure 2:
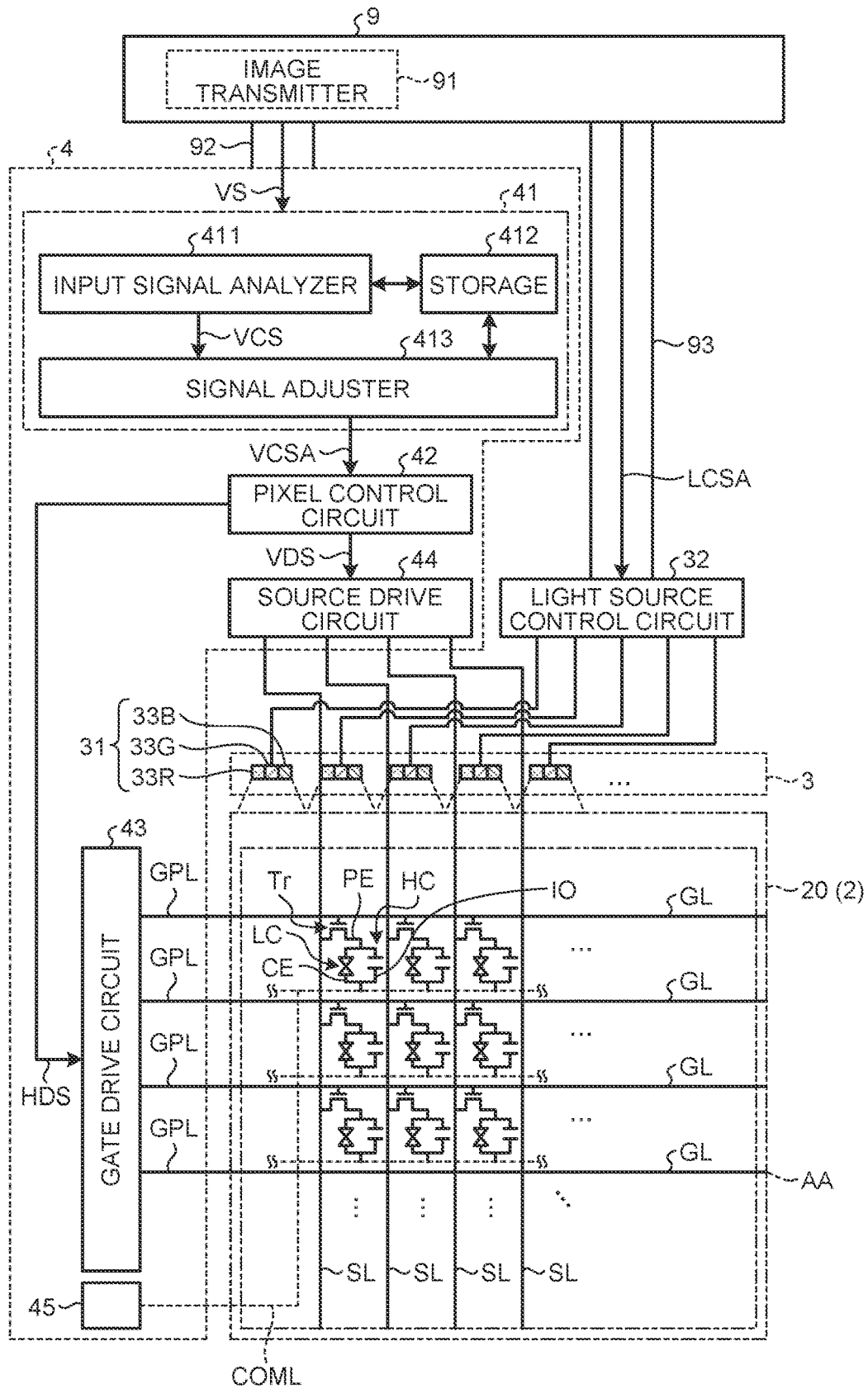
FIG. 2 is a block diagram illustrating a display device according to a first embodiment.
Figure 3:
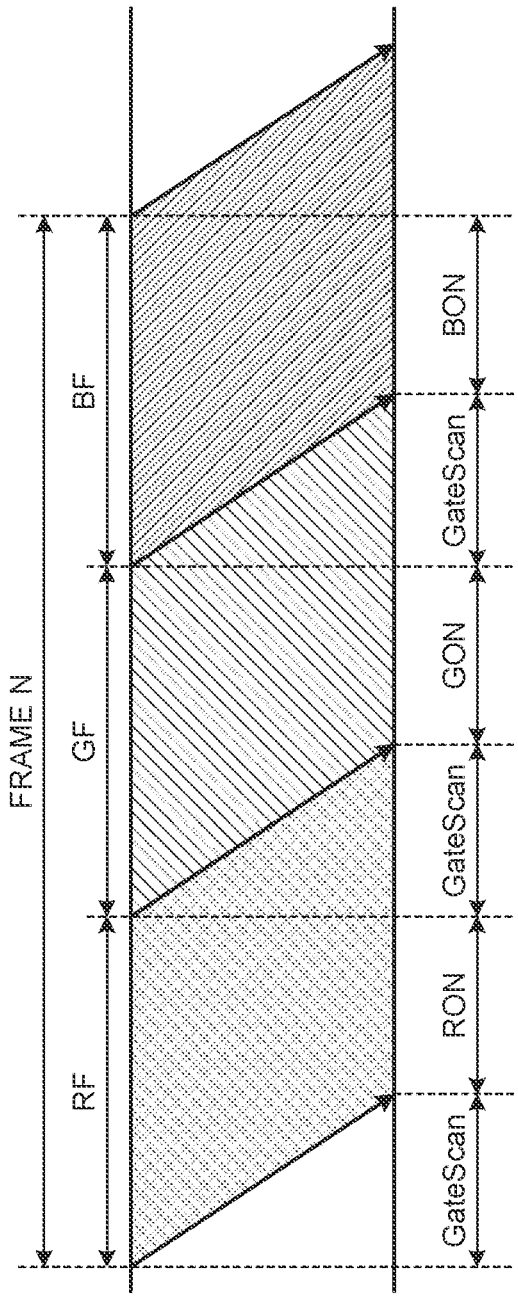
FIG. 3 is a timing diagram explaining timing of light emission by a light source in a field-sequential system of the first embodiment.

FIG. 1 is a perspective view illustrating an example of a display panel according to the present embodiment. FIG. 2 is a block diagram illustrating a display device according to a first embodiment. FIG. 3 is a timing diagram explaining timing of light emission by a light source in a field-sequential system of the first embodiment.

As illustrated in FIG. 1, a display device 1 includes a display panel 2, a light source 3, and a drive circuit 4. A first direction PX denotes one direction in the plane of the display panel 2. A second direction PY denotes a direction orthogonal to the direction PX. A third direction PZ denotes a direction orthogonal to the PX-PY plane. The term "plan view" refers to the positional relation when viewed in the third direction PZ.

Figure 5:
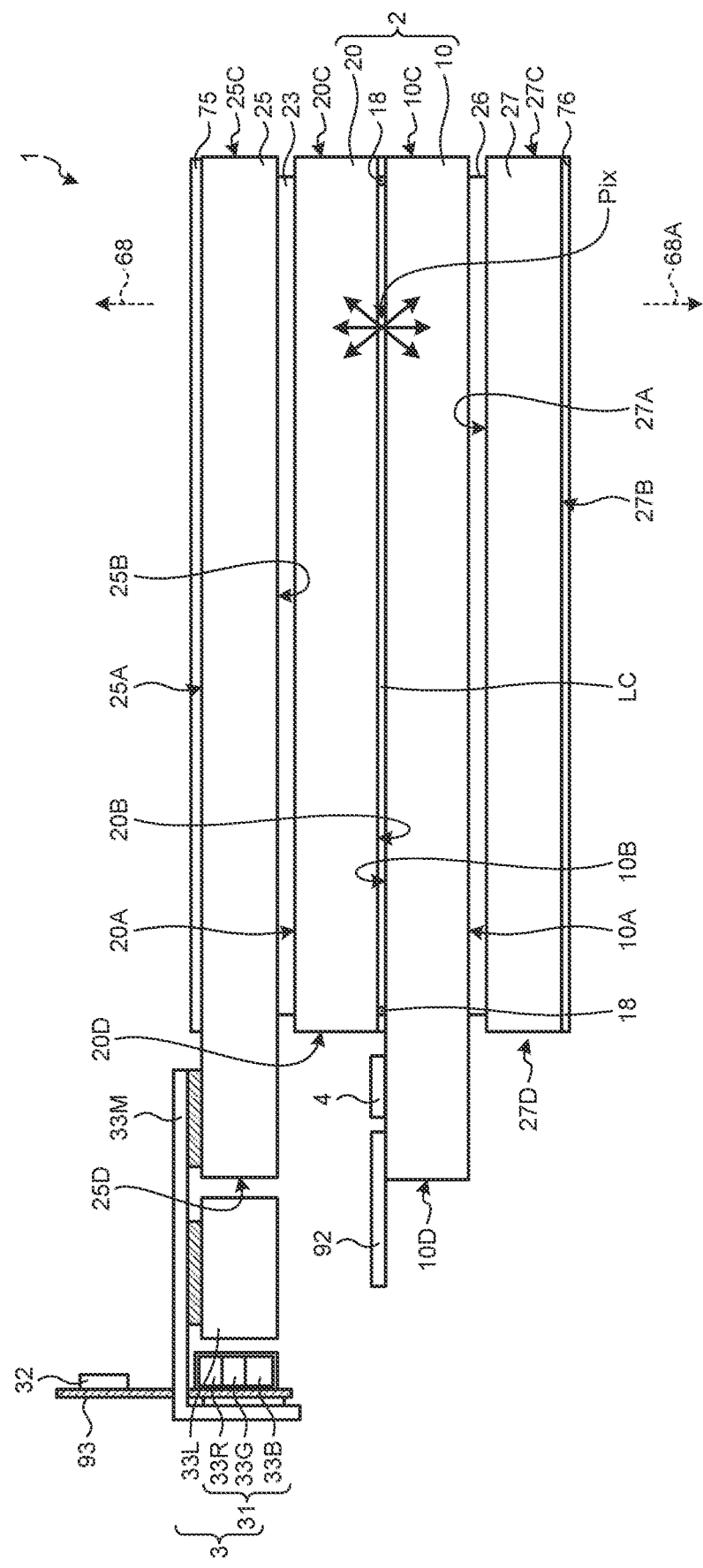
FIG. 5 is a sectional view illustrating an example of a section of the display device.

The display panel 2 includes an array substrate 10, a counter substrate 20, and a liquid crystal layer 50 (refer to FIG. 5). The array substrate 10 serves as a first light-transmitting substrate, and the counter substrate 20 serves as a second light-transmitting substrate. The counter substrate 20 faces a surface of the array substrate 10 in a direction orthogonal thereto (in the direction PZ illustrated in FIG. 1). In the liquid crystal layer 50 (refer to FIG. 5), polymer-dispersed liquid crystals LC (to be described later) are sealed by the array substrate 10, the counter substrate 20, and a sealing portion 18.

As illustrated in FIG. 1, the display panel 2 has an active area AA capable of displaying images and a peripheral area FR outside the active area AA. A plurality of pixels Pix are arranged in a matrix having a row-column configuration in the active area AA. In the present disclosure, a row refers to a pixel row including m pixels Pix arranged in one direction. In addition, a column refers to a pixel column including n pixels Pix arranged in a direction orthogonal to the direction in which the rows extend. The values of m and n are determined depending on a display resolution in the vertical direction and a display resolution in the horizontal direction. A plurality of scan lines GL are arranged one in every other row, and a plurality of signal lines SL are arranged corresponding to the columns. The detailed configurations of the scan lines GL and the signal lines SL will be described below with reference to FIG. 10 and later drawings.

As illustrated in FIG. 2, the light source 3 includes a plurality of light emitters 31. A light source controller (light source control circuit) 32 is provided on a wiring substrate 93. The wiring substrate 93 is a flexible printed circuit board or a printed circuit board (PCB) substrate. A light source control signal LCSA is transmitted from an image transmitter 91 of an external higher-level controller 9 to the light source controller 32. The light source control signal LCSA is a signal including information on light quantities of the light emitters 31 set according to, for example, input gradation values given to the pixels Pix.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area in the PX-PY plane larger than that of the counter substrate 20, and the drive circuit 4 is provided on a projecting portion of the array substrate 10 exposed from the counter substrate 20.

The signal processing circuit 41 receives a first input signal (such as a red-green-blue (RGB) signal) VS from the image transmitter 91 of the external higher-level controller 9 through a flexible printed circuit board 92.

The signal processing circuit 41 includes an input signal analyzer 411, a storage 412, and a signal adjuster 413. The input signal analyzer 411 generates a second input signal VCS based on the externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42.

The pixel control circuit 42 generates a horizontal drive signal HDS and a vertical drive signal VDS based on the third input signal VCSA. In the present embodiment, since the display device 1 is driven based on the field-sequential system, the horizontal drive signal HDS and the vertical drive signal VDS are generated for each color emittable by the light emitters 31.

The gate drive circuit 43 sequentially selects the scan lines GL of the display panel 2 based on the horizontal drive signal HDS within one vertical scan period. The scan lines GL can be selected in any order. The gate drive circuit 43 is electrically coupled to the scan lines GL through second wiring GPL arranged in the peripheral area FR outside the active area AA (refer to FIG. 1).

The source drive circuit 44 supplies gradation signals corresponding to output gradation values of the pixels Pix to the signal lines SL of the display panel 2 based on the vertical drive signal VDS within one horizontal scan period.

In the present embodiment, the display panel 2 is an active-matrix panel. Therefore, the display panel 2 includes the signal (source) lines SL extending in the second direction PY and the scan (gate) lines GL extending in the first direction PX in plan view, and includes switching elements Tr at intersecting portions between the signal lines SL and the scan lines GL.

A thin-film transistor is used as each of the switching elements Tr. A bottom-gate transistor or a top-gate transistor may be used as an example of the thin-film transistor. Although a single-gate thin-film transistor is exemplified as the switching element Tr, the switching element Tr may be a double-gate transistor. One of the source electrode and the drain electrode of the switching element Tr is coupled to a corresponding one of the signal lines SL. The gate electrode of the switching element Tr is coupled to a corresponding one of the scan lines GL. The other of the source electrode and the drain electrode is coupled to one end of a capacitor of the polymer-dispersed liquid crystals LC to be described later. The capacitor of the polymer-dispersed liquid crystals LC is coupled at one end thereof to the switching element Tr through a pixel electrode PE, and coupled at the other end thereof to common potential line COML through a common electrode CE. Holding capacitance HC is generated between the pixel electrode PE and a holding capacitance electrode IO electrically coupled to the common potential line COML. The potential of the common potential line COML is supplied from the common potential drive circuit 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the first color is lit up during the first color light emission period RON.

Then, in a second sub-frame (second predetermined time) GF, the light emitter 33G of the second color emits light during a second color light emission period GON, and the pixels Pix selected during the one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the second color is lit up during the second color light emission period GON.

Further, in a third sub-frame (third predetermined time) BF, the light emitter 33B of the third color emits light during a third color light emission period BON, and the pixels Pix selected during the one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be achieved. In the color filter system, one pixel is made up of sub-pixels obtained by dividing each of the pixels Pix into the sub-pixels of the first color, the second color, and the third color. In contrast, in the field-sequential system, the pixel may not be divided into the sub-pixels in such a manner. A fourth sub-frame may be further included to emit light in a fourth color different from any one of the first color, the second color, and the third color.

Figure 4:
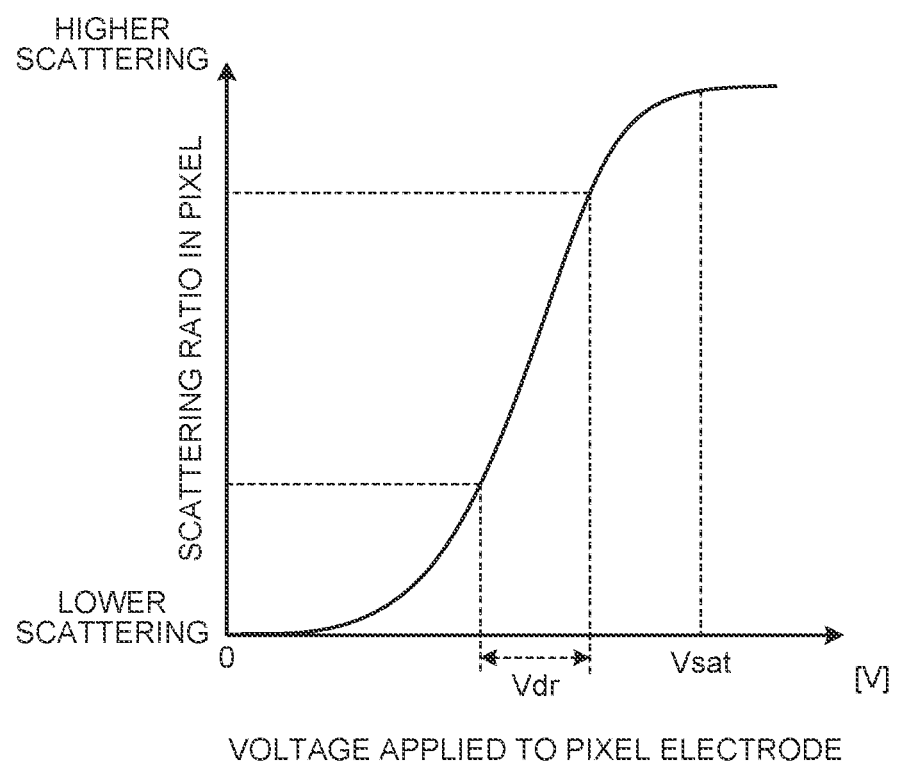
FIG. 4 is an explanatory diagram illustrating a relation between a voltage applied to a pixel electrode and a scattering state of a pixel.
Figure 6:
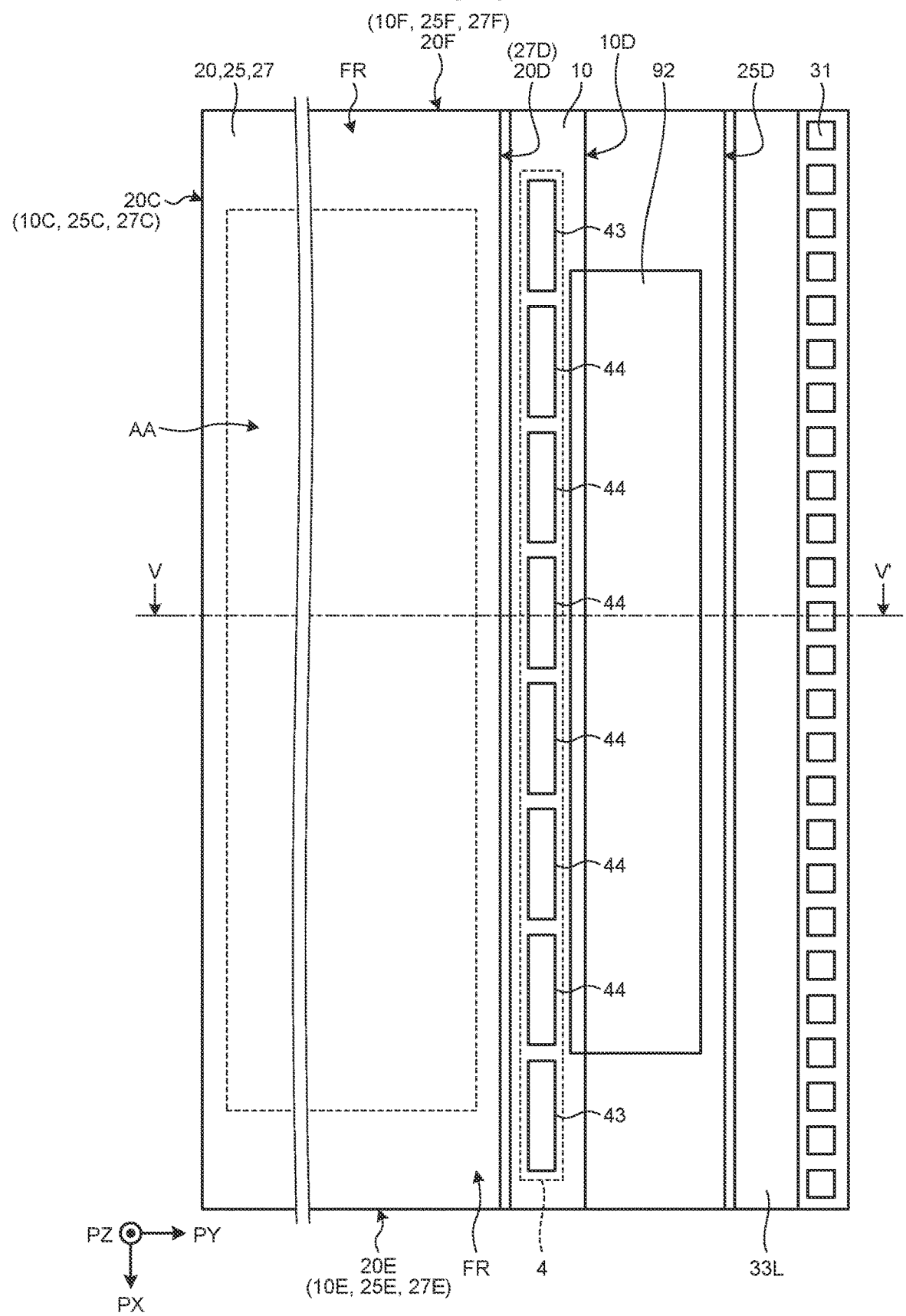
FIG. 6 is a plan view illustrating a planar surface of the display device of FIG. 1.
Figure 7:
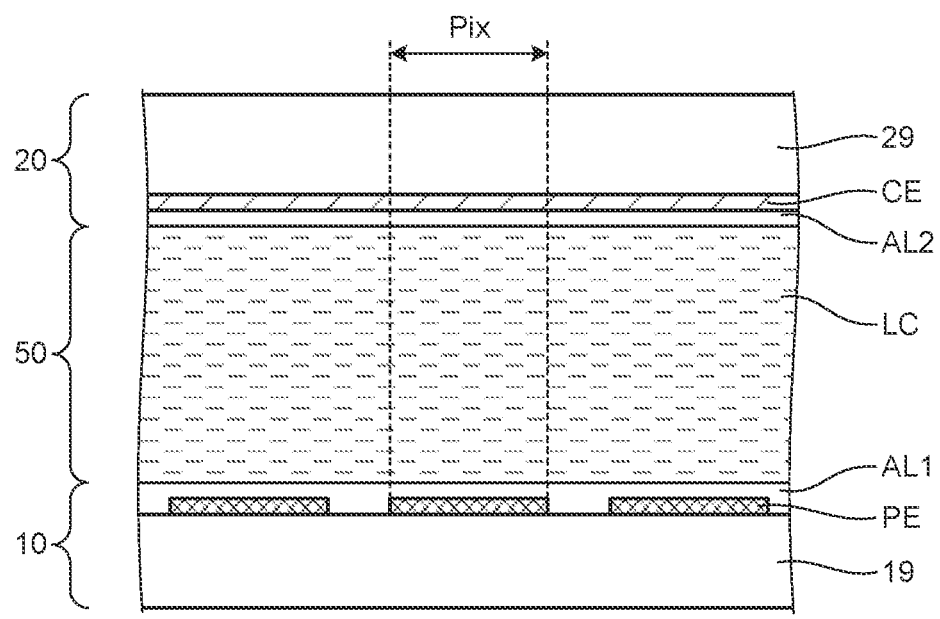
FIG. 7 is an enlarged sectional view obtained by enlarging a liquid crystal layer portion of FIG. 5.
Figure 8:
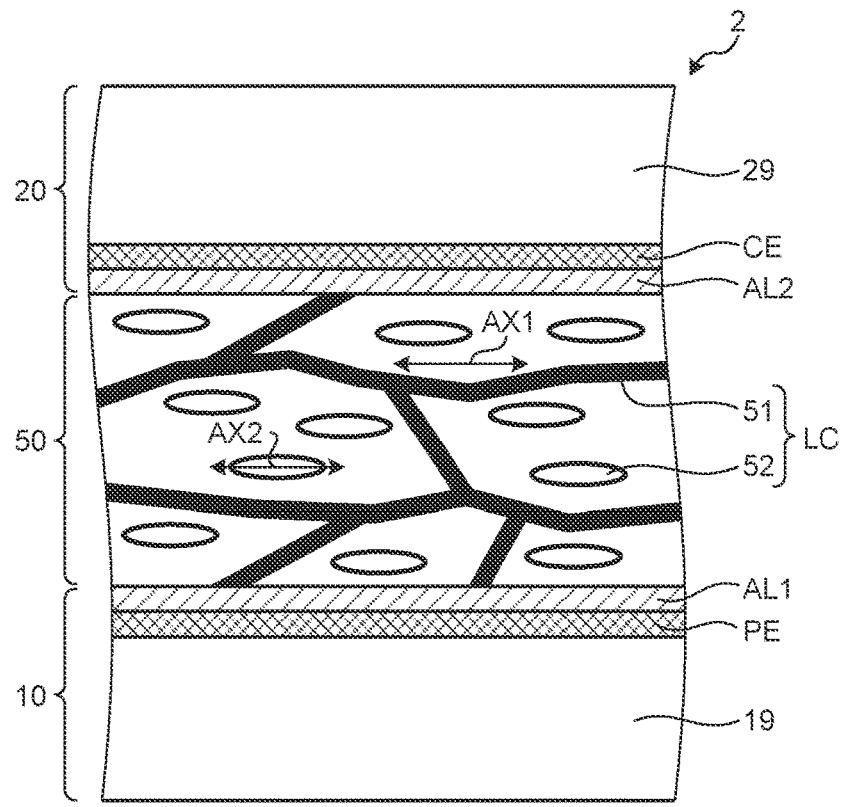
FIG. 8 is a sectional view for explaining a non-scattering state in the liquid crystal layer.
Figure 9:
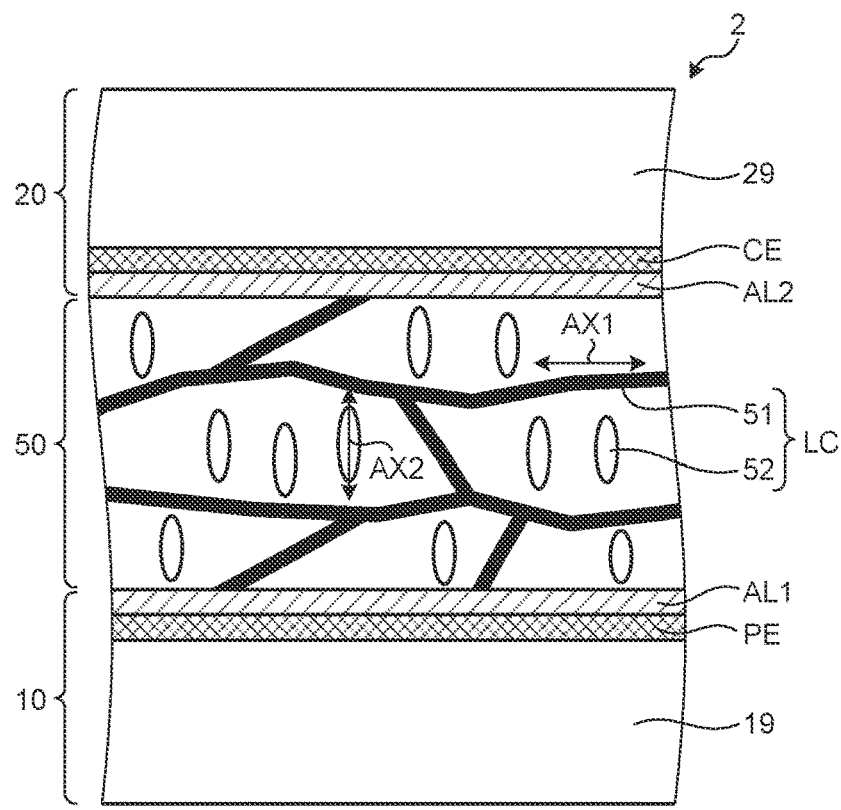
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an example of a section of the display device. FIG. 6 is a plan view illustrating a planar surface of the display device of FIG. 1. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal corresponding to the output gradation value of each of the pixels Pix is supplied to the above-described signal lines SL for the pixels Pix selected during the one vertical scan period GateScan, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled in accordance with the voltage applied to the pixel electrode PE, and the scattering ratio in the pixels Pix changes, as illustrated in FIG. 4.

As illustrated in FIG. 4, the change in the scattering rate in the pixel Pix is smaller when the voltage applied to the pixel electrode PE is equal to or higher than a saturation voltage Vsat. Therefore, the drive circuit 4 changes the voltage applied to the pixel electrode PE in accordance with the vertical drive signal VDS within a voltage range Vdr lower than the saturation voltage Vsat.

As illustrated in FIG. 5, the display device 1 includes a light-transmitting first base member 25, the display panel 2, and a light-transmitting second base member 27. A protective layer 75 is provided on one surface of the light-transmitting first base member 25. A protective layer 76 is provided on one surface of the light-transmitting second base member 27.

The display panel 2 includes the array substrate 10, the counter substrate 20, and the liquid crystal layer 50. The counter substrate 20 faces a surface of the array substrate 10 in a direction orthogonal thereto (in the direction PZ illustrated in FIG. 1). In the liquid crystal layer 50, the polymer-dispersed liquid crystals (to be described later) are sealed by the array substrate 10, the counter substrate 20, and the sealing portion 18.

As illustrated in FIGS. 5 and 6, the array substrate has a first principal surface 10A, a second principal surface 10B, a first side surface 10C, a second side surface 10D, a third side surface 10E, and a fourth side surface 10F. The first principal surface 10A and the second principal surface 10B are parallel flat surfaces. The first side surface 10C and the second side surface 10D are parallel flat surfaces. The third side surface 10E and the fourth side surface 10F are parallel flat surfaces.

As illustrated in FIGS. 5 and 6, the counter substrate has a first principal surface 20A, a second principal surface 20B, a first side surface 20C, a second side surface 20D, a third side surface 20E, and a fourth side surface 20F. The first principal surface 20A and the second principal surface 20B are parallel flat surfaces. The first side surface 20C and the second side surface 20D are parallel flat surfaces. The third side surface 20E and the fourth side surface 20F are parallel flat surfaces.

As illustrated in FIGS. 5 and 6, the first base member has a first principal surface 25A, a second principal surface 25B, a first side surface 25C, a second side surface 25D, a third side surface 25E, and a fourth side surface 25F. The first principal surface 25A and the second principal surface 25B are parallel flat surfaces. The first side surface 25C and the second side surface 25D are parallel flat surfaces. The third side surface 25E and the fourth side surface 25F are parallel flat surfaces.

The first base member 25 is bonded to the first principal surface 20A of the counter substrate 20 with an optical resin 23 interposed therebetween. The first base member 25 is a protective substrate for the counter substrate 20, and is formed, for example, of glass or a light-transmitting resin. When the first base member 25 is formed of a glass base material, it is also called a cover glass. When the first base member 25 is formed of a light-transmitting resin, it may be flexible. The same base material as the first base member 25 may be bonded to the first principal surface 10A of the array substrate 10 with an optical resin interposed therebetween.

As illustrated in FIGS. 5 and 6, the second base member 27 has a first principal surface 27A, a second principal surface 27B, a first side surface 27C, a second side surface 27D, a third side surface 27E, and a fourth side surface 27F. The first principal surface 27A and the second principal surface 27B are parallel flat surfaces. The first side surface 27C and the second side surface 27D are parallel flat surfaces. The third side surface 27E and the fourth side surface 27F are parallel flat surfaces.

The second base member 27 is bonded to the first principal surface 10A of the array substrate 10 with an optical resin 26 interposed therebetween. The second base member 27 is a protective substrate for the array substrate and is formed, for example, of glass or a light-transmitting resin. When the second base member 27 is formed of a glass base material, it is also called a cover glass. When the second base member 27 is formed of a light-transmitting resin, it may be flexible.

As illustrated in FIGS. 5 and 6, the light source 3 faces the second side surface 25D of the first base member 25. The light source 3 may also be called a side light source. As illustrated in FIG. 5, the light source 3 emits light-source light to the second side surface 25D of the first base member 25. The second side surface 25D of the first base member 25 facing the light source 3 serves as a plane of light incidence. The plane of light incidence facing the light source 3 may be the second side surface of the counter substrate 20 or the second side surface 27D of the second base member 27.

The light source 3 includes the light emitters 31 and a light guide 33L. The light emitters 31 include the light emitter 33R of the first color (such as red), the light emitter 33G of the second color (such as green), and the light emitter 33B of the third color (such as blue). The light guide 33L guides the light emitted by the light emitter 33R of the first color, the light emitter 33G of the second color, and the light emitter 33B of the third color to the second side surface 25D of the first base member 25. The light guide 33L receives the light simultaneously from the light emitters 31, internally diffuses the received light, and emits the diffused light to the display panel 2. As a result, the distribution of light per unit area irradiating the second side surface 25D of the first base member 25 is made uniform.

The light guide 33L is a single light guide 33L formed integrally from the third side surface 25E to the fourth side surface 25F. The light guide 33L may be formed by arranging a plurality of divided light guides from the third side surface 25E to the fourth side surface 25F. The light guide 33L may be formed by arranging the divided light guides from the third side surface 25E to the fourth side surface 25F and connecting the adjacent light guides to each other.

The light emitters 31 and the light guide 33L are fixed together with an adhesive material or the like, and assembled to a support 33M to form a light source module. The support 33M is mounted so as to overlap the first principal surface 25A of the first base member 25, and is fixed to the first base member 25 with an adhesive material or the like.

The wiring substrate 93 (flexible printed circuit board or PCB substrate) is provided with an integrated circuit of the light source controller 32, and the light source controller 32 is coupled to the light source 3 through the wiring substrate 93 (flexible printed circuit board or PCB substrate). The wiring substrate 93 is fixed to the support 33M with an adhesive material or the like.

As illustrated in FIG. 5, the light-source light emitted from the light source 3 propagates in a direction (second direction PY) away from the second side surface 20D while being reflected by any of the first base member 25, the array substrate 10, the counter substrate 20, and the second base member 27.

As illustrated in FIG. 5, the light-source light that has propagated in any of the first base member 25, the array substrate 10, the counter substrate 20, and the second base member 27 is scattered by the pixels Pix including the liquid crystals in the scattering state, and the angle of incidence of the scattered light becomes an angle smaller than the critical angle. Thus, emission light 68 and 68A is emitted outward from the first principal surface 20A of the counter substrate 20 (the first principal surface 25A of the first base member 25) and the first principal surface 10A of the array substrate 10, respectively. The emission light 68 and 68A emitted outward from the first principal surface 20A of the counter substrate 20 and the first principal surface 10A of the array substrate 10, respectively, is viewed by a viewer.

Therefore, as illustrated in FIG. 6, the light emitters 31 are arranged at a predetermined pitch in areas provided in the second directions PY with respect to the active area AA.

As illustrated in FIG. 6, the drive circuit 4 described above includes a plurality of integrated circuits of the gate drive circuit 43 and a plurality of integrated circuits of the source drive circuit 44.

The following describes the polymer-dispersed liquid crystals in the scattering state and the polymer-dispersed liquid crystals in the non-scattering state, using FIGS. 7 to 9.

As illustrated in FIG. 7, the array substrate 10 is provided with a first orientation film AL1. The counter substrate 20 is provided with a second orientation film AL2. When the orientation films are subjected to orientation treatment, for example, the orientation treatment is applied such that the orientation direction of the first orientation film AL1 is oriented toward one side of the first direction PX, and the orientation direction of the second orientation film AL2 is oriented toward the other side of the first direction PX. The first and the second orientation films AL1 and AL2 may be, for example, vertical orientation films, or may be orientation films oriented in the first direction PX in which the light emitters 31 are arranged. The orientation treatment is applied by rubbing treatment or photo-orientation treatment.

The polymer-dispersed liquid crystals LC of the liquid crystal layer 50 illustrated in FIG. 7 are sealed between the array substrate 10 and the counter substrate 20. Then, in a state where the monomer and the liquid crystals are oriented by the first and the second orientation films AL1 and AL2, the monomer is polymerized by ultraviolet rays or heat to form a three-dimensional mesh-like polymer network 51. This process forms the liquid crystal layer 50 including the reverse-mode polymer-dispersed liquid crystals LC in which liquid crystal molecules 52 are dispersed in gaps of the three-dimensional mesh-like polymer network 51 formed in the mesh shape.

Thus, the polymer-dispersed liquid crystals LC include the three-dimensional mesh-like polymer network 51 and the liquid crystal molecules 52.

The orientation of the liquid crystal molecules 52 is controlled by a voltage difference between the pixel electrode PE and the common electrode CE. The voltage applied to the pixel electrode PE changes the orientation of the liquid crystal molecules 52. The degree of scattering of light passing through the pixels Pix changes with change in the orientation of the liquid crystal molecules 52.

For example, as illustrated in FIG. 8, the direction of an optical axis AX1 of the polymer network 51 is substantially equal to the direction of an optical axis AX2 of the liquid crystal molecules 52 when no voltage is applied between the pixel electrode PE and the common electrode CE. The optical axis AX2 of the liquid crystal molecules 52 is parallel to the first direction PX (FIG. 6) of the liquid crystal layer 50. The optical axis AX1 of the polymer network 51 is parallel to the first direction PX of the liquid crystal layer 50 regardless of whether a voltage is applied.

Ordinary-ray refractive indices of the polymer network 51 and the liquid crystal molecules 52 are equal to each other. When no voltage is applied between the pixel electrode PE and the common electrode CE, the refractive index difference between the polymer network 51 and the liquid crystal molecules 52 is substantially zero in all directions. The liquid crystal layer 50 is placed in the non-scattering state of not scattering the light-source light. The light-source light propagates in a direction away from the light source 3 (the light emitter 31). When the liquid crystal layer 50 is in the non-scattering state of not scattering the light-source light, a background on the first principal surface 20A side of the counter substrate 20 is visible from the first principal surface of the array substrate 10, and a background on the first principal surface 10A side of the array substrate 10 is visible from the first principal surface 20A of the counter substrate 20.

As illustrated in FIG. 9, in the space between the pixel electrode PE and the common electrode CE having a voltage applied thereto, the optical axis AX2 of the liquid crystal molecules 52 is inclined by an electric field generated between the pixel electrode PE and the common electrode CE. Since the optical axis AX1 of the polymer network 51 is not changed by the electric field, the direction of the optical axis AX1 of the polymer network 51 differs from the direction of the optical axis AX2 of the liquid crystal molecules 52. The light-source light is scattered in the pixel Pix including the pixel electrode PE having a voltage applied thereto. As described above, the viewer views a part of the scattered light-source light emitted outward from the first principal surface 10A of the array substrate 10 or the first principal surface 20A of the counter substrate 20.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is received from the image transmitter 91, the voltage is applied to the pixel electrode PE of the pixel Pix for displaying an image, and an image based on the third input signal VCSA becomes visible together with the background. In this manner, the image is displayed in the display area when the polymer-dispersed liquid crystals LC are in the scattering state.

The light-source light is scattered in the pixel Pix including the pixel electrode PE having a voltage applied thereto, and emitted outward to display the image, which is displayed so as to be superimposed on the background. In other words, the display device 1 of the present embodiment can display the image so as to be superimposed on the background by combining the emission light 68 or 68A with the background.

A potential of each of the pixel electrodes PE (refer to FIG. 7) written during the one vertical scan period GateScan illustrated in FIG. 3 needs to be held during at least one of the first color light emission period RON, the second color light emission period GON, and the third color light emission period BON after each one vertical scan period GateScan. If the written potential of each of the pixel electrodes PE (refer to FIG. 7) cannot be held during at least one of the first color light emission period RON, the second color light emission period GON, and the third color light emission period BON after each one vertical scan period GateScan, what are called flickers or the like are likely to occur. In other words, in order to shorten the one vertical scan period GateScan serving as a time for selecting the scan lines and increase the visibility in the driving based on what is called the field-sequential system, the written potential of each of the pixel electrodes PE (refer to FIG. 7) is required to be easily held during each of the first color light emission period RON, the second color light emission period GON, and the third color light emission period BON.

Figure 10:
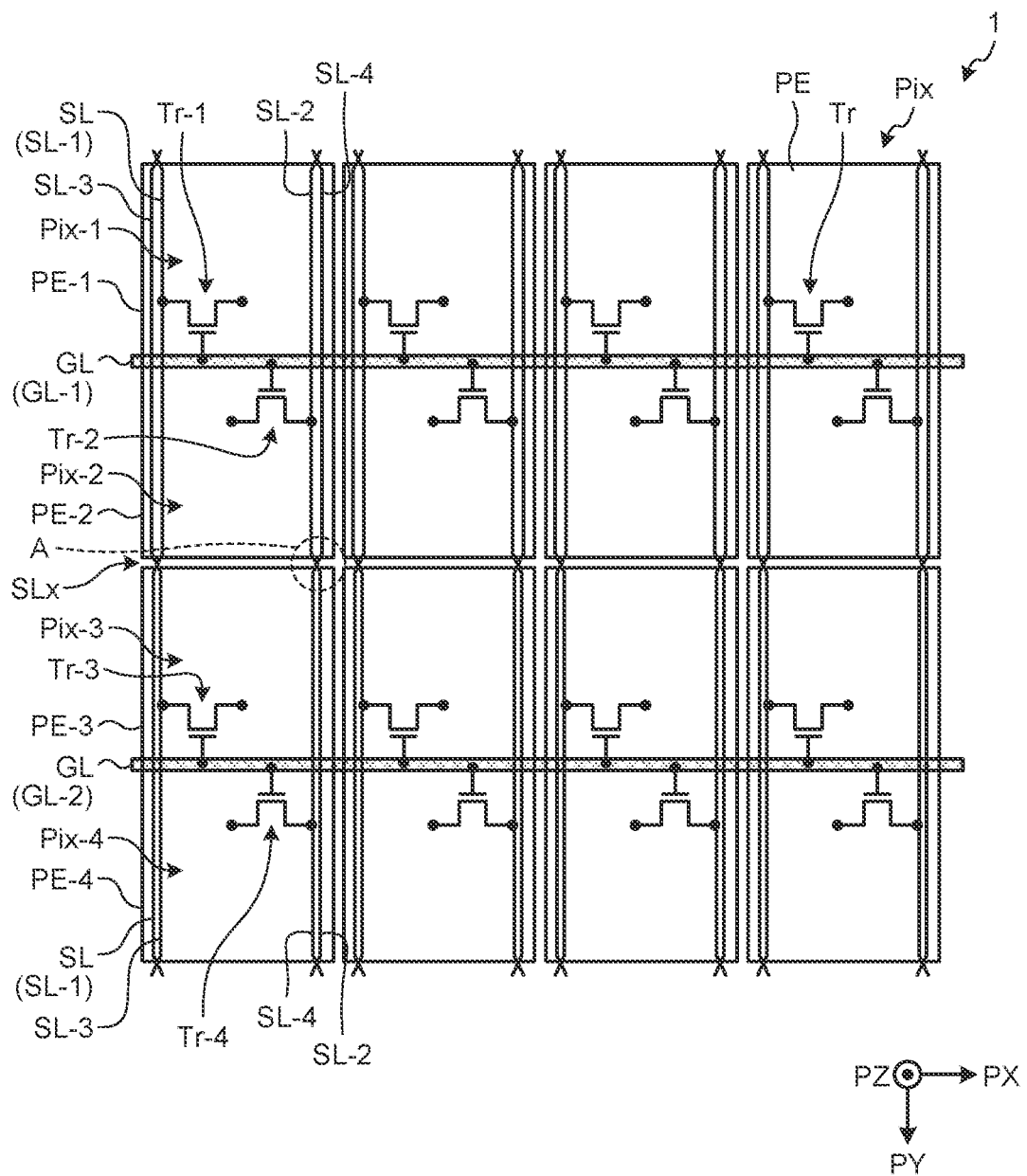
FIG. 10 is a circuit diagram illustrating a pixel array according to the first embodiment.

FIG. 10 is a circuit diagram illustrating the pixel array according to the first embodiment. As illustrated in FIG. 10, the pixels Pix are arranged in a matrix having a row-column configuration. The pixel Pix includes the pixel electrode PE and the switching element Tr. The pixel electrodes PE are arranged in a matrix having a row-column configuration so as to be separated for each of the pixels Pix. The switching element Tr is a thin-film transistor. As described above, in the switching element Tr, a source electrode SE (refer to FIG. 16) is coupled to the signal line SL; a gate electrode GE (refer to FIG. 16) is coupled to the scan line GL; and a drain electrode DE (refer to FIG. 16) is coupled to the pixel electrode PE.

The scan lines GL are provided on a first light-transmitting substrate 19 (refer to FIG. 17) and extend along the first direction PX. The signal lines SL extend in the second direction PY and intersect the scan lines GL in plan view.

The following describes a coupling configuration of the pixels Pix to the scan lines GL and the signal lines SL for one pixel column. One pixel column includes a first pixel Pix-1, a second pixel Pix-2, a third pixel Pix-3, and a fourth pixel Pix-4 arranged in the second direction PY. The first pixel Pix-1 includes a first pixel electrode PE-1 and a first switching element Tr-1. The second pixel Pix-2 includes a second pixel electrode PE-2 and a second switching element Tr-2. The third pixel Pix-3 includes a third pixel electrode PE-3 and a third switching element Tr-3. The fourth pixel Pix-4 includes a fourth pixel electrode PE-4 and a fourth switching element Tr-4.

In the following description, the first pixel Pix-1, the second pixel Pix-2, the third pixel Pix-3, and the fourth pixel Pix-4 will each be simply referred to as the pixel Pix when need not be distinguished from one another. In the same manner, the first pixel electrode PE-1, the second pixel electrode PE-2, the third pixel electrode PE-3, and the fourth pixel electrode PE-4 will each be simply referred to as the pixel electrode PE when need not be distinguished from one another. The first switching element Tr-1, the second switching element Tr-2, the third switching element Tr-3, and the fourth switching element Tr-4 will each be simply referred to as the switching element Tr when need not be distinguished from one another.

The first pixel electrode PE-1, the second pixel electrode PE-2, the third pixel electrode PE-3, and the fourth pixel electrode PE-4 are arranged in this order in the second direction PY. The first switching element Tr-1 is electrically coupled to the first pixel electrode PE-1. The second switching element Tr-2 is electrically coupled to the second pixel electrode PE-2. The third switching element Tr-3 is electrically coupled to the third pixel electrode PE-3. The fourth switching element Tr-4 is electrically coupled to the fourth pixel electrode PE-4.

The scan lines GL are provided in every other pixel row in the pixels Pix arranged in the second direction PY. Specifically, in FIG. 10, a first scan line GL-1 is disposed between the first pixel electrode PE-1 (first pixel Pix-1) and the second pixel electrode PE-2 (second pixel Pix-2) that are arranged in the second direction PY, and is electrically coupled to the first switching element Tr-1 and the second switching element Tr-2.

The first scan line GL-1 and a second scan line GL-2 are arranged in the second direction PY with a gap as large as two pixels interposed therebetween. That is, the scan line GL is not provided between the second pixel Pix-2 and the third pixel Pix-3 adjacent to each other in the second direction PY. The second scan line GL-2 is disposed between the third pixel electrode PE-3 (third pixel Pix-3) and the fourth pixel electrode PE-4 (fourth pixel Pix-4) that are arranged in the second direction PY, and is electrically coupled to the third switching element Tr-3 and the fourth switching element Tr-4.

Four of the signal lines SL are provided for one pixel column. A first signal line SL-1 and a third signal line SL-3 are provided on the left side of the pixel column (the first pixel Pix-1, the second pixel Pix-2, the third pixel Pix-3, and the fourth pixel Pix-4), and each extend in the second direction PY. A second signal line SL-2 and a fourth signal line SL-4 are provided on the right side of the pixel column (the first pixel Pix-1, the second pixel Pix-2, the third pixel Pix-3, and the fourth pixel Pix-4), and each extend in the second direction PY.

The first signal line SL-1 is electrically coupled to the first pixel electrode PE-1 through the first switching element Tr-1. The second signal line SL-2 is electrically coupled to the second pixel electrode PE-2 through the second switching element Tr-2. The third signal line SL-3 is electrically coupled to the third pixel electrode PE-3 through the third switching element Tr-3. The fourth signal line SL-4 is electrically coupled to the fourth pixel electrode PE-4 through the fourth switching element Tr-4.

The order of the first signal line SL-1 and the third signal line SL-3 in the first direction PX is interchanged by an intersection SLx. That is, in positions corresponding to the first and the second pixels Pix-1 and Pix-2, the third signal line SL-3 and the first signal line SL-1 are provided to be arranged in this order in the first direction PX. In positions corresponding to the third and the fourth pixels Pix-3 and Pix-4, the first signal line SL-1 and the third signal line SL-3 are provided to be arranged in this order in the first direction PX.

In the same manner, the order of the second signal line SL-2 and the fourth signal line SL-4 in the first direction PX is interchanged by the intersection SLx. That is, in positions corresponding to the first and the second pixels Pix-1 and Pix-2, the second signal line SL-2 and the fourth signal line SL-4 are provided to be arranged in this order in the first direction PX. In positions corresponding to the third and the fourth pixels Pix-3 and Pix-4, the fourth signal line SL-4 and the second signal line SL-2 are provided to be arranged in this order in the first direction PX.

As a result, even in the configuration where more than one of the signal lines SL are provided for one pixel column, the arrangement relation and the coupling configuration between the switching element Tr and the corresponding signal line SL can be the same among the pixels Pix. For example, the first and the second switching elements Tr-1 and Tr-2 coupled to the first scan line GL-1 have the same arrangement relation and the same coupling configuration as those of the third and the fourth switching elements Tr-3 and Tr-4 coupled to the second scan line GL-2.

While the above has described the one pixel column (the first pixel Pix-1, the second pixel Pix-2, the third pixel Pix-3, and the fourth pixel Pix-4), more than one of the pixel columns each having the four signal lines SL and having the same coupling configuration are arranged in the first direction PX, as illustrated in FIG. 10. While FIG. 10 illustrates four pixel rows, the first signal line SL-1 to the fourth signal line SL-4 are coupled to the pixels Pix in the same configuration for each set of the four pixel rows.

Figure 11:
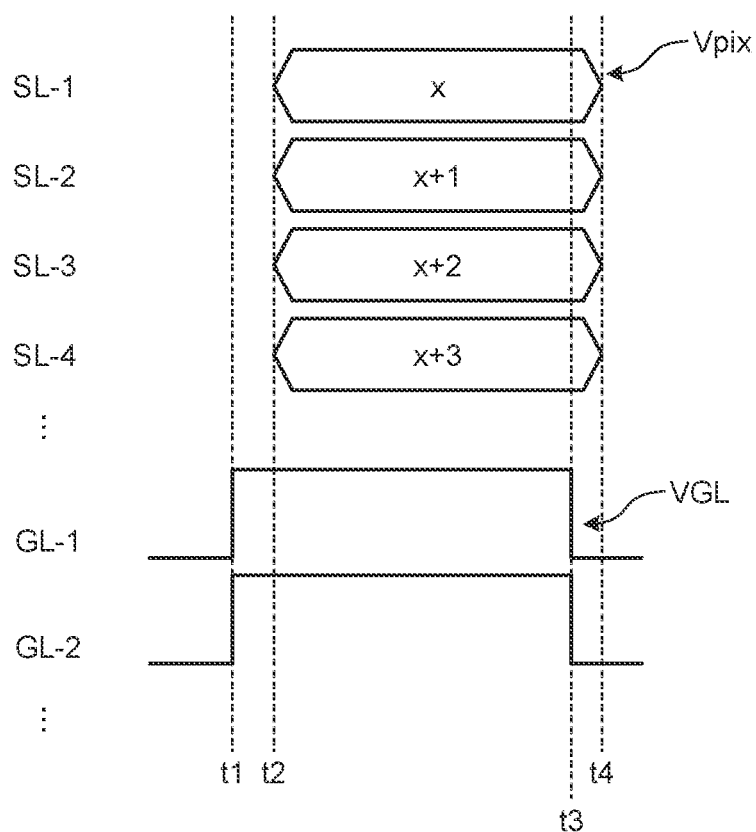
FIG. 11 is a timing diagram illustrating an operation example of the display device according to the first embodiment.

FIG. 11 is a timing diagram illustrating an operation example of the display device according to the first embodiment. As illustrated in FIG. 11, the gate drive circuit 43 (refer to FIG. 2) supplies a gate drive signal VGL at a high-level voltage to the first scan line GL-1 and the second scan line GL-2 at time t1. This operation selects the four pixel rows coupled to the first and the second scan lines GL-1 and GL-2.

The source drive circuit 44 (refer to FIG. 2) supplies a gradation signal Vpix to each of the first signal line SL-1, the second signal line SL-2, the third signal line SL-3, and the fourth signal line SL-4 at time t2. This operation simultaneously writes the gradation signal Vpix to the pixels Pix in the four rows. During a period when the gate drive signal VGL is on, the source drive circuit 44 sequentially supplies the gradation signal Vpix to each of the pixel columns from the first pixel column to the last pixel column, that is, to each set of the four signal lines SL (the first signal line SL-1, the second signal line SL-2, the third signal line SL-3, and the fourth signal line SL-4).

The gate drive circuit 43 sets the gate drive signal VGL to a low-level voltage at time t3, and the source drive circuit 44 ends the writing to the pixels Pix in the four rows at time t4. Subsequently, the gate drive circuit 43 sequentially supplies the gate drive signal VGL to each set of the two scan lines GL (that is, to each set of the pixels Pix in the four rows).

With the above-described configuration, the four pixel rows including the first pixel Pix-1 to the fourth pixel Pix-4 arranged in the second direction PY are selected by the gate drive signal VGL supplied to the first and the second scan lines GL-1 and GL-2 in the same period. The simultaneously selected pixels Pix (for example, the first pixel Pix-1 to the fourth pixel Pix-4) are coupled to the signal lines SL different from one another, and are supplied with the different gradation signals Vpix corresponding to the respective pixels Pix. As a result, in the present embodiment, the period for writing the gradation signals Vpix to the pixels Pix can be made four times longer than that in a case where the scan line GL is provided for each pixel row and the scan lines GL are sequentially selected in a time-divisional manner.

Figure 12:
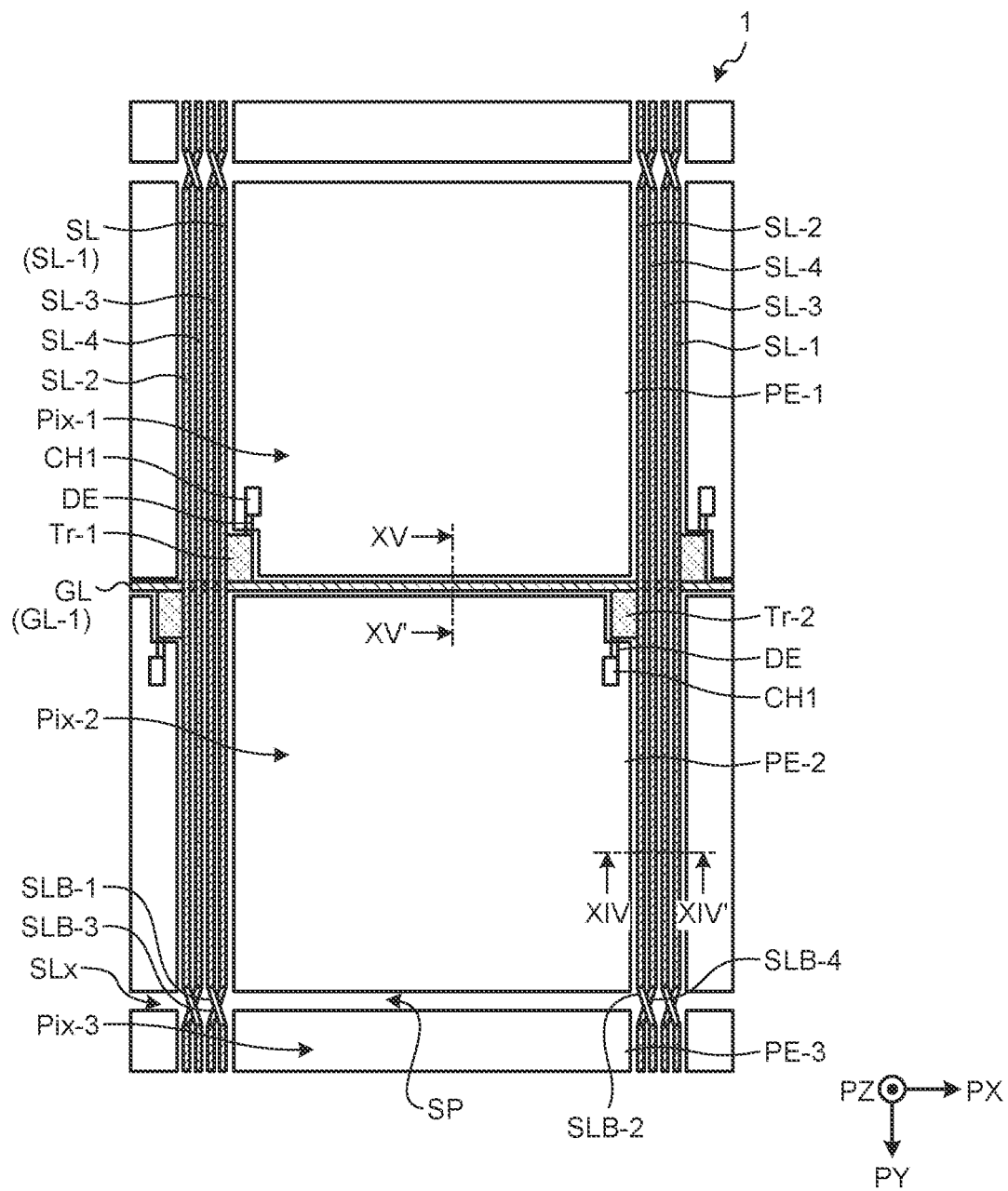
FIG. 12 is a plan view illustrating a scan line, signal lines, and switching elements for a plurality of pixels according to the first embodiment.

The following describes a detailed configuration example of the scan lines GL, the signal lines SL, and the switching elements Tr. FIG. 12 is a plan view illustrating the scan line, the signal lines, and the switching elements for the pixels according to the first embodiment. FIG. 12 illustrates an enlarged view of the first pixel Pix-1 and the second pixel Pix-2 in FIG. 10.

As illustrated in FIG. 12, the first scan line GL-1 is disposed between the first pixel electrode PE-1 and the second pixel electrode PE-2 in the second direction PY, and extends in the first direction PX. The second pixel electrode PE-2 and the third pixel electrode PE-3 are arranged in the second direction PY with a gap SP interposed therebetween. That is, the scan line GL is not provided between the second pixel electrode PE-2 and the third pixel electrode PE-3.

As described above, in the first direction PX, the pixel electrode PE is located between the two signal lines SL (the first signal line SL-1 and the third signal line SL-3) and the other two signal lines SL (the second signal line SL-2 and the fourth signal line SL-4) among the first signal line SL-1, the second signal line SL-2, the third signal line SL-3, and the fourth signal line SL-4. In FIG. 12, in one pixel column, two of the signal lines SL (the first signal line SL-1 and the third signal line SL-3) are arranged on the left side of the pixel electrode PE, and two of the signal lines SL (the second signal line SL-2 and the fourth signal line SL-4) are arranged on the right side of the pixel electrode PE. In other words, four of the signal lines SL are arranged collectively between two pixel columns adjacent to each other in the first direction PX, and each extend in the second direction PY. The four signal lines SL are provided between the pixel electrodes PE adjacent in the first direction PX. Of the four signal lines SL arranged collectively, the two on the right side (the first signal line SL-1 and the third signal line SL-3) are coupled to a pixel column on the right side thereof, and the two on the left side (the second signal line SL-2 and the fourth signal line SL-4) are coupled to a pixel column on the left side thereof.

The first switching element Tr-1 is provided at an intersecting portion between the first scan line GL-1 and the first signal line SL-1. The drain electrode DE of the first switching element Tr-1 is electrically coupled to the first pixel electrode PE-1 through a contact hole CH1.

The second switching element Tr-2 is provided at an intersecting portion between the first scan line GL-1 and the second signal line SL-2. The drain electrode DE of the second switching element Tr-2 is electrically coupled to the second pixel electrode PE-2 through a contact hole CH1.

The first switching element Tr-1 is located on the left side of the first pixel electrode PE-1, and the second switching element Tr-2 is located on the right side of the second pixel electrode PE-2. That is, the second switching element Tr-2 is located opposite the first switching element Tr-1 in the first direction PX. The first switching element Tr-1 is located on one side in the second direction PY with respect to the first scan line GL-1, and the second switching element Tr-2 is located on the other side in the second direction PY with respect to the first scan line GL-1. That is, the second switching element Tr-2 is located opposite the first switching element Tr-1 with the first scan line GL-1 interposed therebetween in the second direction PY.

With the above-described configuration, the first switching element Tr-1 coupled to the first pixel electrode PE-1 and the second switching element Tr-2 coupled to the second pixel electrode PE-2 are electrically coupled to the first scan line GL-1 common thereto.

Although not illustrated in any drawing, the third switching element Tr-3 of the third pixel Pix-3 and the fourth switching element Tr-4 of the fourth pixel Pix-4 also have the same arrangement relation and the same coupling configuration as those of the first and the second switching elements Tr-1 and Tr-2, respectively, and are coupled to the second scan line GL-2.

This configuration can reduce the number of the scan lines GL to approximately a half that of a configuration in which the scan line GL is provided for each of the rows of the pixels Pix arranged in the second direction PY. As a result, the light traveling in the display panel 2 along the second direction PY can be restrained from being reflected or scattered by the scan lines GL provided in the array substrate 10. The light reflected or scattered by the scan lines GL is unintended light that is different from the emission light 68 and 68A (refer to FIG. 5). Thus, the display device 1 of the present embodiment can reduce the outward leakage of the light reflected or scattered by the scan lines GL, and thus can improve the display characteristics.

Figure 13:
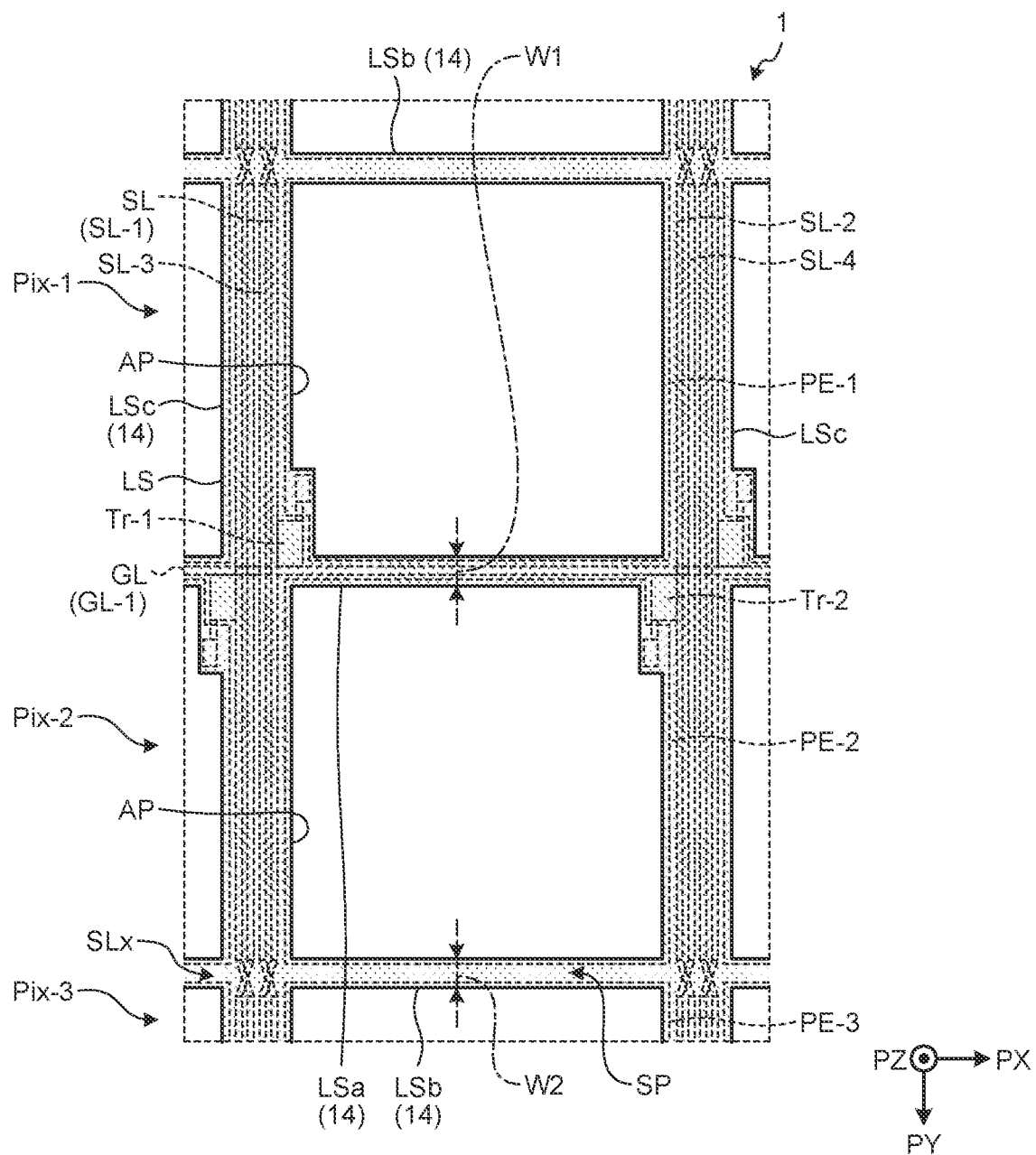
FIG. 13 is a plan view illustrating a light-blocking layer for the pixels according to the first embodiment.

FIG. 13 is a plan view illustrating a light-blocking layer for the pixels according to the first embodiment. A light-blocking layer LS is provided in the counter substrate 20 (refer to FIG. 17) and disposed so as to overlap the scan lines GL, the signal lines SL, and the switching elements Tr. In more detail, the light-blocking layer LS includes a first portion LSa, a second portion LSb, and a third portion LSc. The first portion LSa extends in the first direction PX so as to overlap the scan line GL. The second portion LSb extends in the first direction PX so as to overlap the gap SP between the second pixel electrode PE-2 and the third pixel electrode PE-3. The third portion LSc extends in the second direction PY so as to overlap the signal lines SL and the switching elements Tr.

The first and the second portions LSa and LSb intersect the third portions LSc in plan view to be provided in a grid shape. An opening AP surrounded by the first portion LSa, the second portion LSb, and the third portion LSc is formed in an area overlapping the pixel electrode PE.

The second portion LSb of the light-blocking layer LS is disposed in an area between the second pixel Pix-2 and the third pixel Pix-3 where no scan line GL is provided. This configuration can reduce the variation in transmittance of light between an area between the first pixel Pix-1 and the second pixel Pix-2 where the scan line GL is provided and the area between the second pixel Pix-2 and the third pixel Pix-3 where the scan line GL is not provided.

A width W2 in the second direction PY of the second portion LSb can be made smaller than a width W1 in the second direction PY of the first portion LSa. This configuration can increase the aperture ratio of each of the pixels Pix in the present embodiment. Since the third portion LSc overlaps the four signal lines SL, the width in the first direction PX of the third portion LSc is larger than each of the widths W1 and W2.

The second portion LSb can be omitted as required. That is, the light-blocking layer LS may have a configuration that is not provided in the area overlapping the gap SP between the pixel electrodes PE adjacent in the second direction PY.

Figure 14:
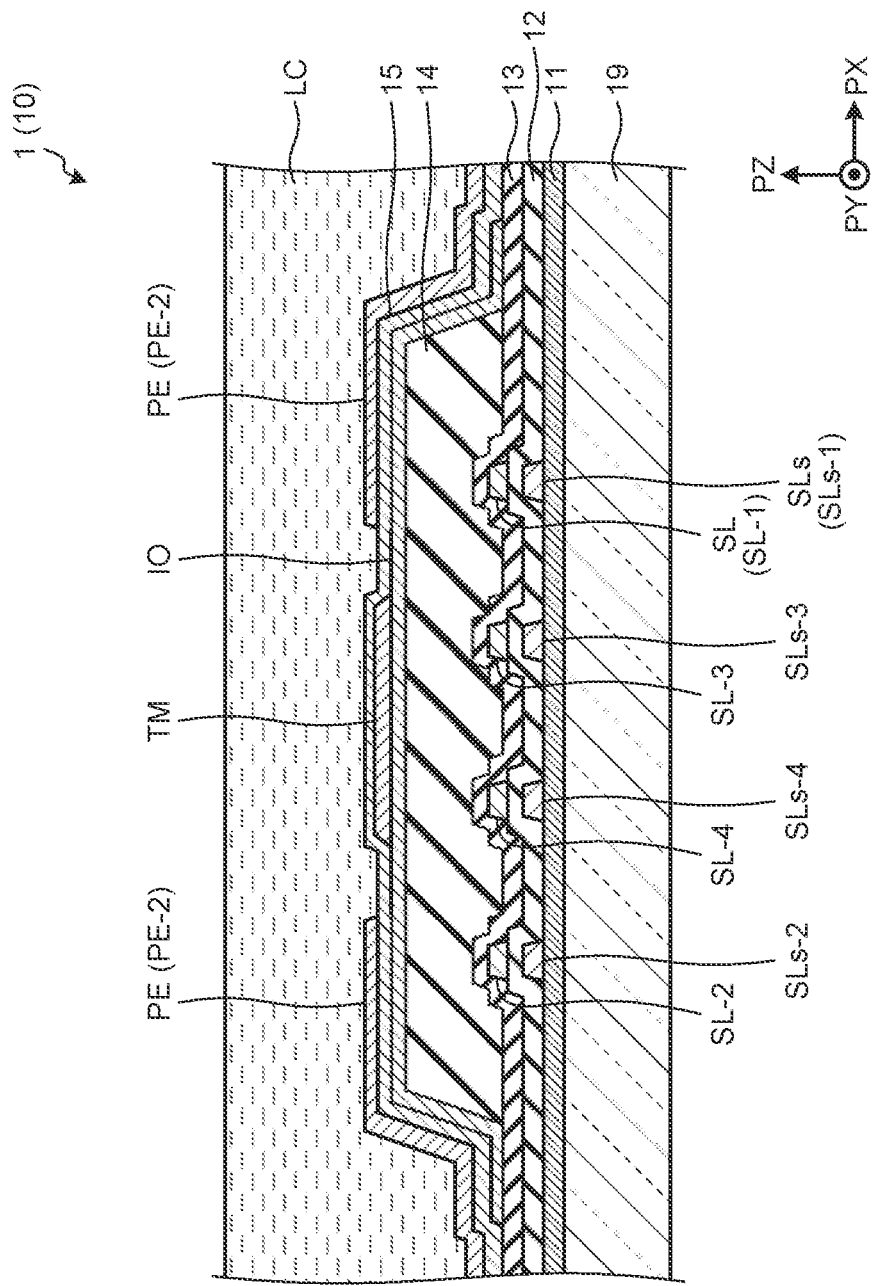
FIG. 14 is a sectional view along XIV-XIV' of FIG. 12.

The following describes a sectional configuration of the display device 1. FIG. 14 is a sectional view along XIV-XIV' of FIG. 12. As illustrated in FIG. 14, the array substrate 10 includes the first light-transmitting substrate 19 formed of glass, for example. The first light-transmitting substrate 19 may be a resin such as polyethylene terephthalate, as long as having a light-transmitting capability.

The array substrate 10 includes, for example, a first insulating film 11, a second insulating film 12, a third insulating film 13, a fourth insulating film 14, a fifth insulating film 15, the signal lines SL, auxiliary signal lines SLs-1, SLs-2, SLs-3, and SLs-4, the holding capacitance electrode IO, a metal layer TM, and the pixel electrode PE (second pixel electrode PE-2) on a side of the first light-transmitting substrate 19 facing the counter substrate 20.

In the following description, the direction from the array substrate 10 toward the counter substrate 20 (refer to FIG. 17) is referred to as "upper side" or simply "above" or "on". The direction from the counter substrate 20 toward the array substrate 10 is referred to as "lower side" or simply "below". The auxiliary signal lines SLs-1, SLs-2, SLs-3, and SLs-4 will each be simply referred to as "auxiliary signal line SLs" when need not be distinguished from one another.

The first insulating film 11 is provided on the first light-transmitting substrate 19. The auxiliary signal lines SLs are provided on the first insulating film 11. The auxiliary signal lines SLs are provided in the same layer as that of the scan line GL (refer to FIG. 15) and are formed of the same material as that of the scan line GL. The auxiliary signal lines SLs are wiring of a metal such as molybdenum (Mo) or aluminum (Al), a multilayered body of these metals, or an alloy thereof. The signal lines SL are wiring of a metal such as aluminum or an alloy thereof.

The second insulating film 12 is provided on the first insulating film 11 so as to cover the auxiliary signal lines SLs-1, SLs-2, SLs-3, and SLs-4. The signal lines SL (the first signal line SL-1, the second signal line SL-2, the third signal line SL-3, and the fourth signal line SL-4) are provided on the second insulating film 12. The third insulating film 13 is provided on the second insulating film 12 so as to cover the signal lines SL. The first insulating film 11, the second insulating film 12, and the third insulating film 13 are each formed of a light-transmitting inorganic material such as silicon oxide or silicon nitride.

The auxiliary signal lines SLs extend in the second direction PY along the signal lines SL and are provided in positions overlapping the signal lines SL. In more detail, the auxiliary signal lines SLs-2, SLs-4, SLs-3, and SLs-1 are arranged in the first direction PX and provided in positions overlapping the second signal line SL-2, the fourth signal line SL-4, the third signal line SL-3, and the first signal line SL-1, respectively. The auxiliary signal lines SLs are not provided at portions where the scan lines GL intersect the signal lines SL in plan view.

The auxiliary signal lines SLs are electrically coupled to the signal lines SL through contact holes (for example, a contact hole CH11 (refer to FIG. 18)) provided at any locations. With this configuration, wiring resistance provided by the signal lines SL and the auxiliary signal lines SLs is made lower than that of only the signal lines SL. As a result, the gradation signals Vpix supplied to the signal lines SL are restrained from being delayed.

The fourth insulating film 14 (organic insulating film) is provided on the third insulating film 13 in an area overlapping the signal lines SL and the auxiliary signal lines SLs. The fourth insulating film 14 has a grid shape that covers over the scan lines GL and the signal lines SL along the scan lines GL and the signal lines SL. The fourth insulating film 14 is formed of, for example, a light-transmitting organic insulating material such as an acrylic resin. The fourth insulating film 14 is thicker than other insulating films formed of an inorganic material. Therefore, the switching element Tr, the scan line GL, and the signal line SL are located at relatively larger distances from the holding capacitance electrode IO, and are thereby less affected by a common potential from the holding capacitance electrode IO.

In addition, in the array substrate 10, an area without the fourth insulating film 14 is provided in an area overlapping a central portion of the pixel electrode PE (portion excluding an outer edge of the pixel electrode PE that overlaps the fourth insulating film 14). The insulating film overlapping the central portion of the pixel electrode PE in plan view is thinner than the insulating film overlapping the signal lines SL and scan lines GL. As a result, the area overlapping the central portion of the pixel electrode PE has relatively higher transmittance of light and higher light-transmitting capability than areas above the scan lines GL and above the signal lines SL.

The holding capacitance electrode IO is provided on the fourth insulating film 14. The holding capacitance electrode IO is formed of a light-transmitting conductive material such as indium tin oxide (ITO). The holding capacitance electrode IO has a grid shape that covers over the scan lines GL and the signal lines SL along the scan lines GL and the signal lines SL. The holding capacitance electrode IO has an opening provided with no light-transmitting conductive material in the area overlapping the central portion of the pixel electrode PE.

The conductive metal layer TM is provided partially on the holding capacitance electrode IO. The conductive metal layer TM is wiring of a metal such as molybdenum (Mo) or aluminum (Al), a multilayered body of these metals, or an alloy thereof. The metal layer TM has a grid shape along the scan lines GL and the signal lines SL. In other words, the metal layer TM has openings in areas overlapping the pixel electrodes PE.

The metal layer TM only needs to be stacked on the holding capacitance electrode IO and may be located below the holding capacitance electrode IO. The metal layer TM has lower electrical resistance than that of the holding capacitance electrode IO. Therefore, the holding capacitance HC is less variable between the pixels Pix.

The fifth insulating film 15 is provided so as to cover the holding capacitance electrode IO and the metal layer TM. The fifth insulating film 15 is formed of a light-transmitting inorganic material such as silicon oxide or silicon nitride.

The pixel electrode PE is provided on the fifth insulating film 15. The pixel electrode PE is formed of a light-transmitting conductive material such as ITO. As described above, the pixel electrodes PE are partitioned on a pixel Pix basis. In FIG. 14, two of the pixel electrodes PE (second pixel electrodes PE-2) are arranged apart from each other in the first direction PX with the metal layer TM interposed therebetween. The metal layer TM is provided so as to overlap two of the signal lines SL (the third signal line SL-3 and the fourth signal line SL-4). The two pixel electrodes PE are each provided so as to overlap one of the signal lines SL (the first signal line SL-1 and the second signal line SL-2).

In more detail, each of outer edges of the two pixel electrodes PE is provided in a position overlapping a side surface and an upper surface of the fourth insulating film 14, and faces the holding capacitance electrode IO with the fifth insulating film 15 interposed therebetween. A portion of the outer edge of the pixel electrode PE overlaps a slant surface where the thickness of the fourth insulating film 14 changes. This configuration stabilizes the behavior of the liquid crystal molecules between the adjacent pixels Pix.

Figure 15:
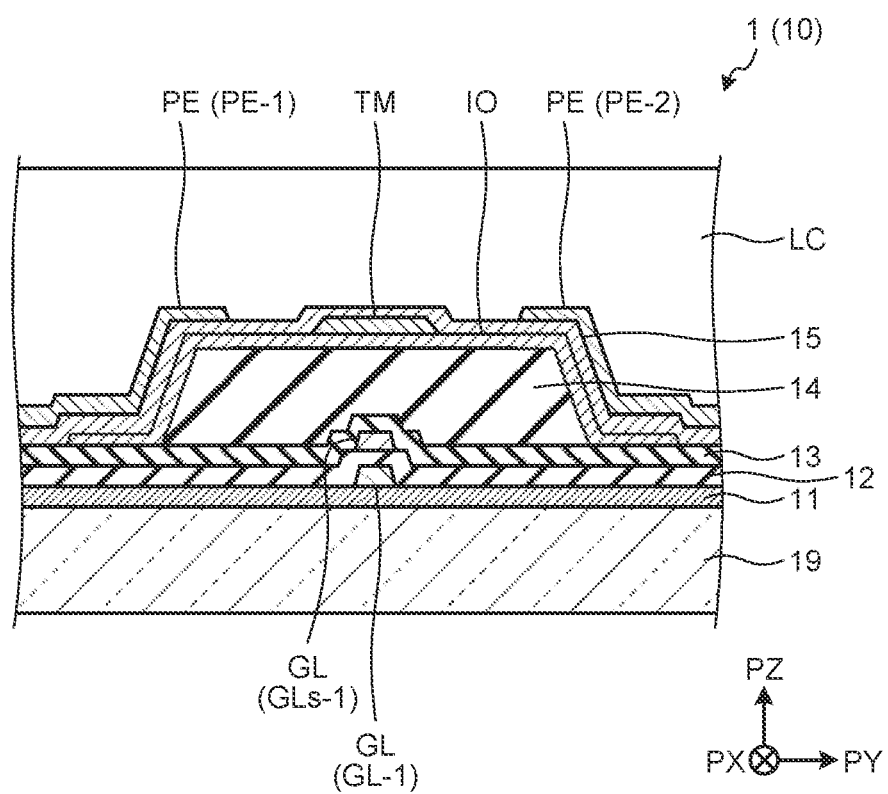
FIG. 15 is a sectional view along XV-XV' of FIG. 12.

FIG. 15 is a sectional view along XV-XV' of FIG. 12. As illustrated in FIG. 15, the multilayered structure of the first light-transmitting substrate 19, the first insulating film 11, the second insulating film 12, the third insulating film 13, the fourth insulating film 14, the fifth insulating film 15, the holding capacitance electrode IO, and the metal layer TM is the same as that in FIG. 14 explained above, and will not be repeatedly described.

As illustrated in FIG. 15, the scan line GL is provided above the first insulating film 11. The scan lines GL are wiring of a metal such as molybdenum (Mo) or aluminum (Al), a multilayered body of these metals, or an alloy thereof.

Auxiliary scan lines GLs are provided above the second insulating film 12. The auxiliary scan lines GLs are provided in the same layer as that of the signal lines SL (refer to FIG. 14), and are formed of the same material as that of the signal lines SL. An auxiliary scan line GLs-1 extends in the second direction PY along the scan line GL and is provided in a position overlapping the scan line GL. The auxiliary scan line GLs-1 is not provided at a portion where the scan line GL intersects the signal line SL in plan view.

The auxiliary scan lines GLs are electrically coupled to the scan lines GL through contact holes (for example, a contact hole CH3 (refer to FIG. 16)) provided at any locations. With this configuration, wiring resistance provided by the scan lines GL and the auxiliary scan lines GLs is made lower than that of only the scan lines GL. As a result, the gate drive signal VGL supplied to the scan lines GL is restrained from being delayed.

The holding capacitance electrode IO and the metal layer TM are provided so as to cover the scan lines GL and the auxiliary scan lines GLs. The multilayered structure of two of the pixel electrodes PE (first and second pixel electrodes PE-1 and PE-2) adjacent in the second direction PY, the fourth insulating film 14, the holding capacitance electrode IO, the metal layer TM, and the fifth insulating film 15 is also the same as that in FIG. 14 explained above. That is, over the outer edges in the first direction PX and the outer edges in the second direction PY of the pixel electrodes PE, the pixel electrodes PE face the holding capacitance electrode IO with the fifth insulating film 15 interposed therebetween.

The sectional structure of the second pixel electrode PE-2 and the third pixel electrode PE-3 adjacent with the gap SP interposed therebetween in the second direction PY has a configuration obtained by omitting the scan line GL and the auxiliary scan line GLs in FIG. 15. That is, in the same manner as in the second portion LSb of the light-blocking layer LS illustrated in FIG. 13, the fourth insulating film 14, the holding capacitance electrode IO, the metal layer TM, and the fifth insulating film 15 are stacked in an area overlapping the gap SP where the scan line GL and the auxiliary scan line GLs are not provided. That is, the fourth insulating film 14 (organic insulating film) is provided so as to cover over the gap SP between the second pixel electrode PE-2 and the third pixel electrode PE-3. This configuration can reduce the variation in the behavior of the liquid crystal molecules between the area between the first pixel Pix-1 and the second pixel Pix-2 where the scan line GL is provided, and the area between the second pixel Pix-2 and the third pixel Pix-3 where the scan line GL is not provided.

Figure 16:
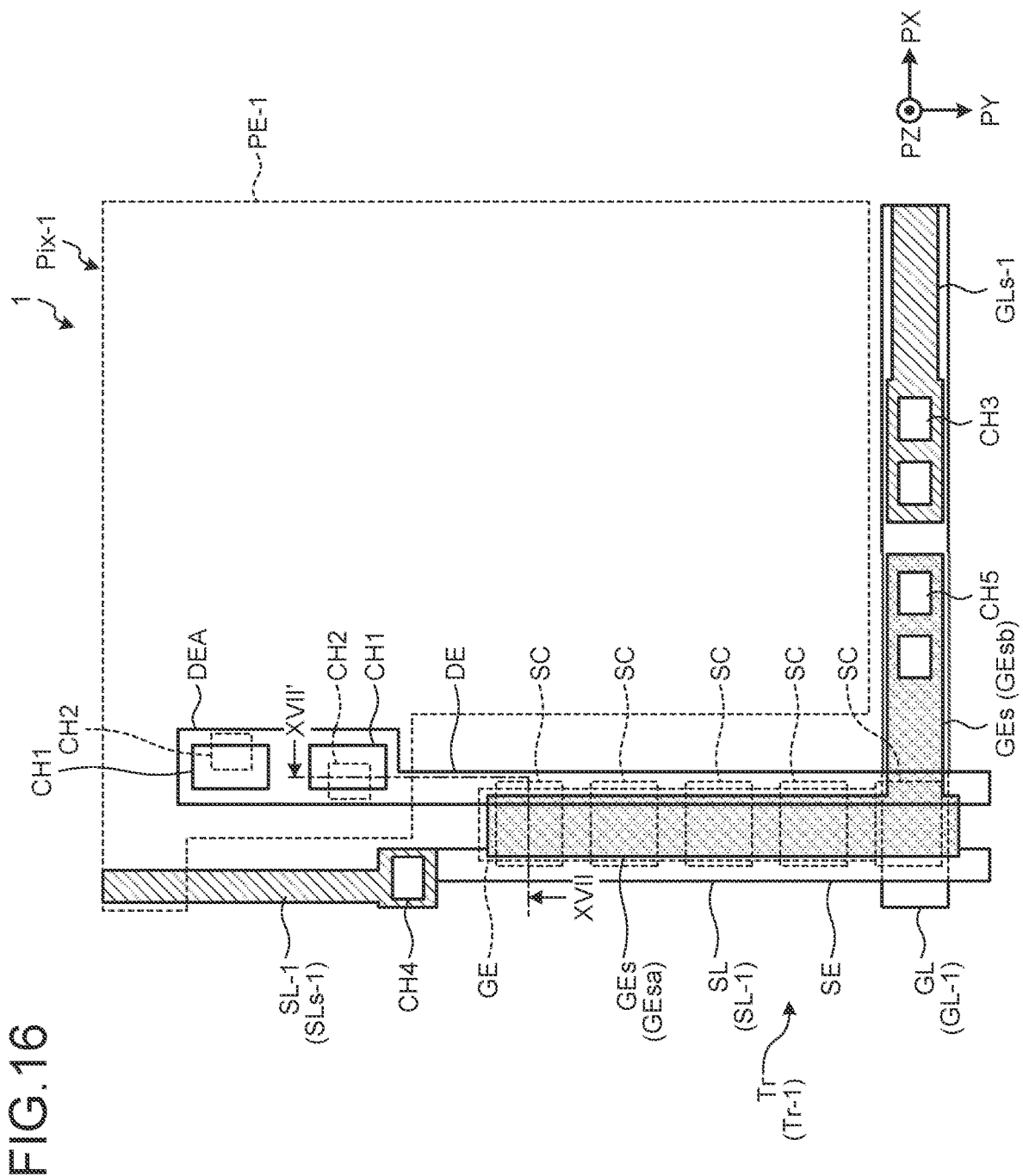
FIG. 16 is a plan view illustrating a configuration example of the switching element illustrated in FIG. 12.

The following describes a detailed configuration example of the switching element Tr. FIG. 16 is a plan view illustrating the configuration example of the switching element illustrated in FIG. 12. Although the first switching element Tr-1 will be described with reference to FIG. 16, the description of the first switching element Tr-1 can also be applied to the third switching element Tr-3. The second switching element Tr-2 and the fourth switching element Tr-4 has the same configuration as that obtained by rotating the first switching element Tr-1 by 180 degrees in plan view, and the description of the first switching element Tr-1 can also be applied to the second switching element Tr-2 and the fourth switching element Tr-4.

As illustrated in FIG. 16, the first switching element Tr-1 includes semiconductor layers SC, the source electrode SE, the drain electrode DE, the gate electrode GE, and an auxiliary gate electrode GEs.

The gate electrode GE is formed integrally with and of the same material as the scan line GL (first scan line GL-1). The gate electrode GE extends in a direction that intersects the extending direction of the scan line GL (first scan line GL-1), that is, the second direction PY.

The semiconductor layers SC are oxide semiconductors, for example. The semiconductor layers SC may be formed of, for example, polycrystalline silicon or amorphous silicon. In the example illustrated in FIG. 16, the first switching element Tr-1 includes five of the semiconductor layers SC. The five semiconductor layers SC are arranged in the second direction PY so as to overlap the gate electrode GE and along the extending direction of the gate electrode GE with a gap therebetween.

The auxiliary gate electrode GEs is provided so as to overlap the gate electrode GE and the semiconductor layers SC. Specifically, the auxiliary gate electrode GEs includes a first electrode portion GEsa and a second electrode portion GEsb. The first electrode portion GEsa extends in the second direction PY so as to overlap the gate electrode GE and the semiconductor layers SC. The second electrode portion GEsb is coupled to the first electrode portion GEsa and extends in the first direction PX so as to overlap the scan line GL. The second electrode portion GEsb is electrically coupled to the scan line GL through a contact hole CH5 at any location. That is, the auxiliary gate electrode GEs is supplied with a signal having the same potential as that of the gate drive signal VGL supplied to the scan line GL.

As described above with reference to FIG. 15, the auxiliary scan line GLs-1 is provided so as to extend in the first direction PX while overlapping the scan line GL (first scan line GL-1). The auxiliary scan line GLs-1 is electrically coupled to the scan line GL through the contact hole CH3. The auxiliary scan line GLs-1 is located in the same layer as that of the signal line SL (source electrode SE) and provided in a layer different from that of the auxiliary gate electrode GEs. For ease of viewing, FIG. 16 illustrates the auxiliary gate electrode GEs and the auxiliary scan line GLs-1 with hatching.

The source electrode SE is formed integrally with the signal line SL (first signal line SL-1) and extends in the second direction PY. In other words, a portion of the signal line SL (first signal line SL-1) coupled to the semiconductor layers SC serves as the source electrode SE. The source electrode SE is coupled to one end side of each of the semiconductor layers SC. The source electrode SE is formed by the single-layer signal line SL. The signal line SL is electrically coupled to the auxiliary signal line SLs through a contact holes CH4 in a position away from the semiconductor layers SC in the second direction PY. For ease of viewing, FIG. 16 illustrates an area formed by overlapping the signal line SL with the auxiliary signal line SLs with hatching.

The drain electrode DE extends in the second direction PY along the source electrode SE. The drain electrode DE is arranged adjacent in the first direction PX to the source electrode SE with a gap interposed therebetween. The drain electrode DE is coupled to the other end side of each of the semiconductor layers SC.

At an end in the second direction PY of the drain electrode DE, a coupling portion DEA is provided in an area overlapping the pixel electrode PE. The coupling portion DEA is electrically coupled to the pixel electrode PE through contact holes CH1 and CH2.

The configuration of the switching element Tr illustrated in FIG. 16 is merely an example and can be changed as appropriate. For example, although the five semiconductor layers SC are coupled in parallel, the number of the semiconductor layers SC is not limited to five, but may be four or smaller, or six or larger. In addition, although both the auxiliary gate electrodes GEs and the gate electrodes GE are preferably provided, either the auxiliary gate electrode GEs or the gate electrodes GE may be omitted.

Figure 17:
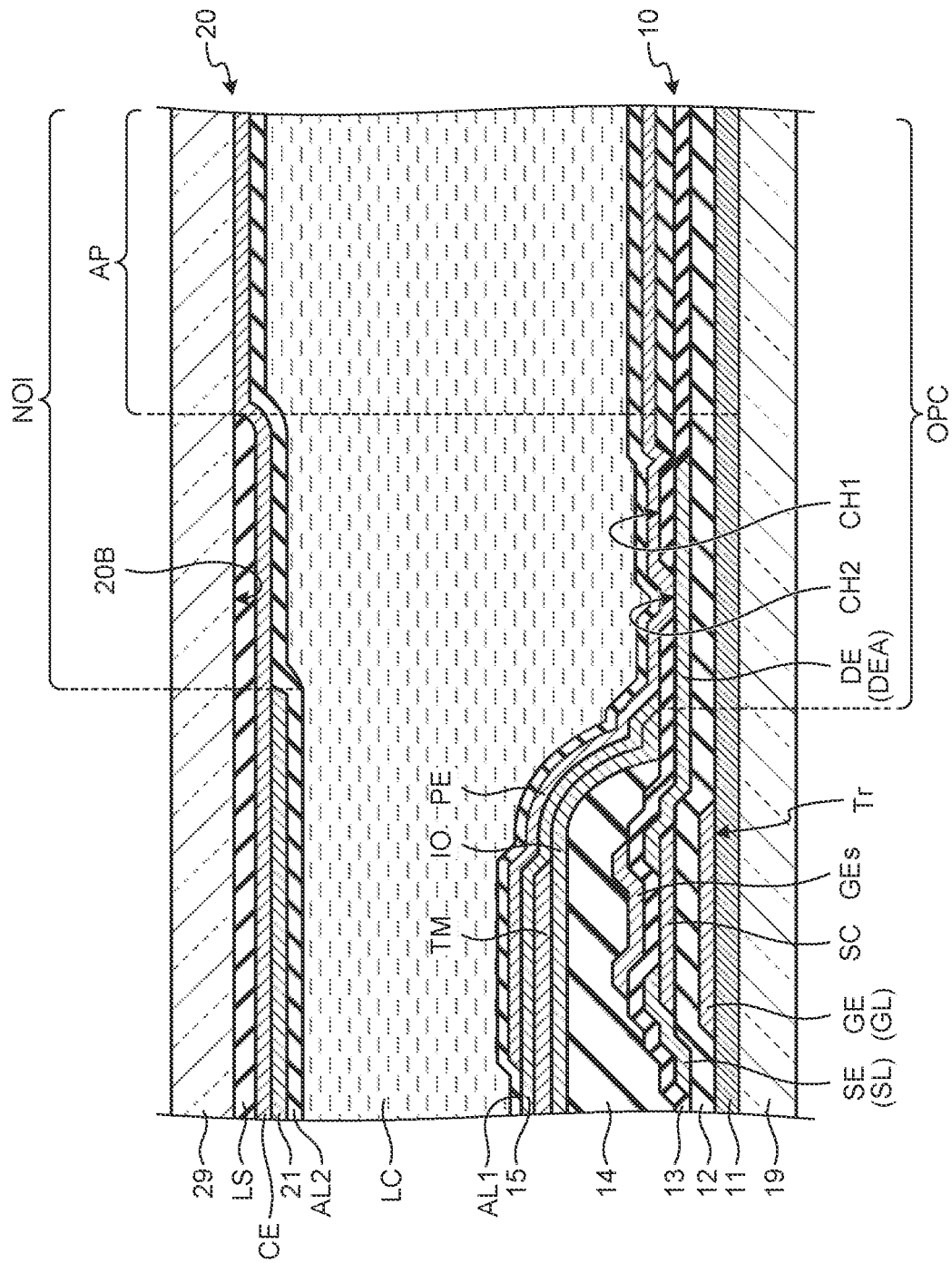
FIG. 17 is a sectional view along XVII-XVII' of FIG. 16.

FIG. 17 is a sectional view along XVII-XVII' of FIG. 16. As illustrated in FIG. 17, the gate electrode GE formed integrally with the scan line GL is provided on the first insulating film 11. The second insulating film 12 is provided on the first insulating film 11 so as to cover the gate electrode GE. The semiconductor layer SC is provided on the second insulating film 12 in a position overlapping the gate electrode GE. The source electrode SE and the drain electrode DE are provided on the second insulating film 12 and are each coupled to the semiconductor layer SC.

The third insulating film 13 is provided on the second insulating film 12 so as to cover the source electrode SE, the drain electrode DE, and the semiconductor layer SC. The auxiliary gate electrode GEs is provided on the third insulating film 13 in a position overlapping the semiconductor layer SC and the gate electrode GE. The semiconductor layer SC is disposed between the gate electrode GE and the auxiliary gate electrode GEs in a direction orthogonal to the first light-transmitting substrate 19.

The fourth insulating film 14 is provided on the third insulating film 13 so as to cover the auxiliary gate electrode GEs. In other words, the fourth insulating film 14 is provided in an area overlapping the switching element Tr. The holding capacitance electrode IO and the metal layer TM are provided on the fourth insulating film 14 in the area overlapping the switching element Tr. The metal layer TM has a larger area than that of the semiconductor layer SC of the switching element Tr. This configuration can reduce leakage of light from the switching element Tr.

The fifth insulating film 15 is provided so as to cover the holding capacitance electrode IO and the metal layer TM. The pixel electrode PE is provided on the fifth insulating film 15. The drain electrode DE and the coupling portion DEA extend to an area overlapping an opening OPC of the holding capacitance electrode IO. In the area overlapping the opening OPC of the holding capacitance electrode IO, the pixel electrode PE is electrically coupled to the coupling portion DEA of the drain electrode DE through the contact hole CH1 passing through the fifth insulating film 15 and the contact hole CH2 passing through the third insulating film 13. The first orientation film AL1 is provided on the pixel electrode PE. The illustration of the first orientation film AL1 is omitted in FIGS. 14 and 15 explained above.

As illustrated in FIG. 17, the counter substrate 20 includes a second light-transmitting substrate 29 formed of glass, for example. The second light-transmitting substrate 29 is provided so as to face the first light-transmitting substrate 19 of the array substrate 10. The second light-transmitting substrate 29 may be a resin such as polyethylene terephthalate, as long as having a light-transmitting capability.

The light-blocking layer LS, the common electrode CE, a protective film 21, and the second orientation film AL2 are provided on the surface (second principal surface 20B) of the second light-transmitting substrate 29 that faces the array substrate 10. The light-blocking layer LS is provided between the second light-transmitting substrate 29 and the common electrode CE. As described above, the light-blocking layer LS is provided in the area overlapping the scan lines GL, the signal lines SL, and the switching elements Tr.

The common electrode CE is provided on the second principal surface 20B of the second light-transmitting substrate 29 so as to cover the light-blocking layer LS. The common electrode CE is formed of a light-transmitting conductive material such as ITO. The protective film 21 and the second orientation film AL2 are provided on a surface of the common electrode CE. The protective film 21 is formed of an inorganic insulating material having an insulating capability and a light transmitting capability, such as silicon nitride or silicon oxide. The second orientation film AL2 is provided on the array substrate 10 side of the protective film 21. The protective film 21 may be a light-blocking inorganic insulating film.

The protective film 21 is formed in a position overlapping the third insulating film 13. In an area overlapping the opening AP, the common electrode CE and the second orientation film AL2 are directly stacked without interposing the protective film 21 therebetween. As a result, the planar shape of the protective film 21 has a grid shape, thus creating non-overlapping areas NCI of the protective film 21. The protective film 21 is not formed in the opening AP of the light-blocking layer LS. However, the protective film 21 may be provided so as to cover the entire surface of the common electrode CE.

Figure 18:
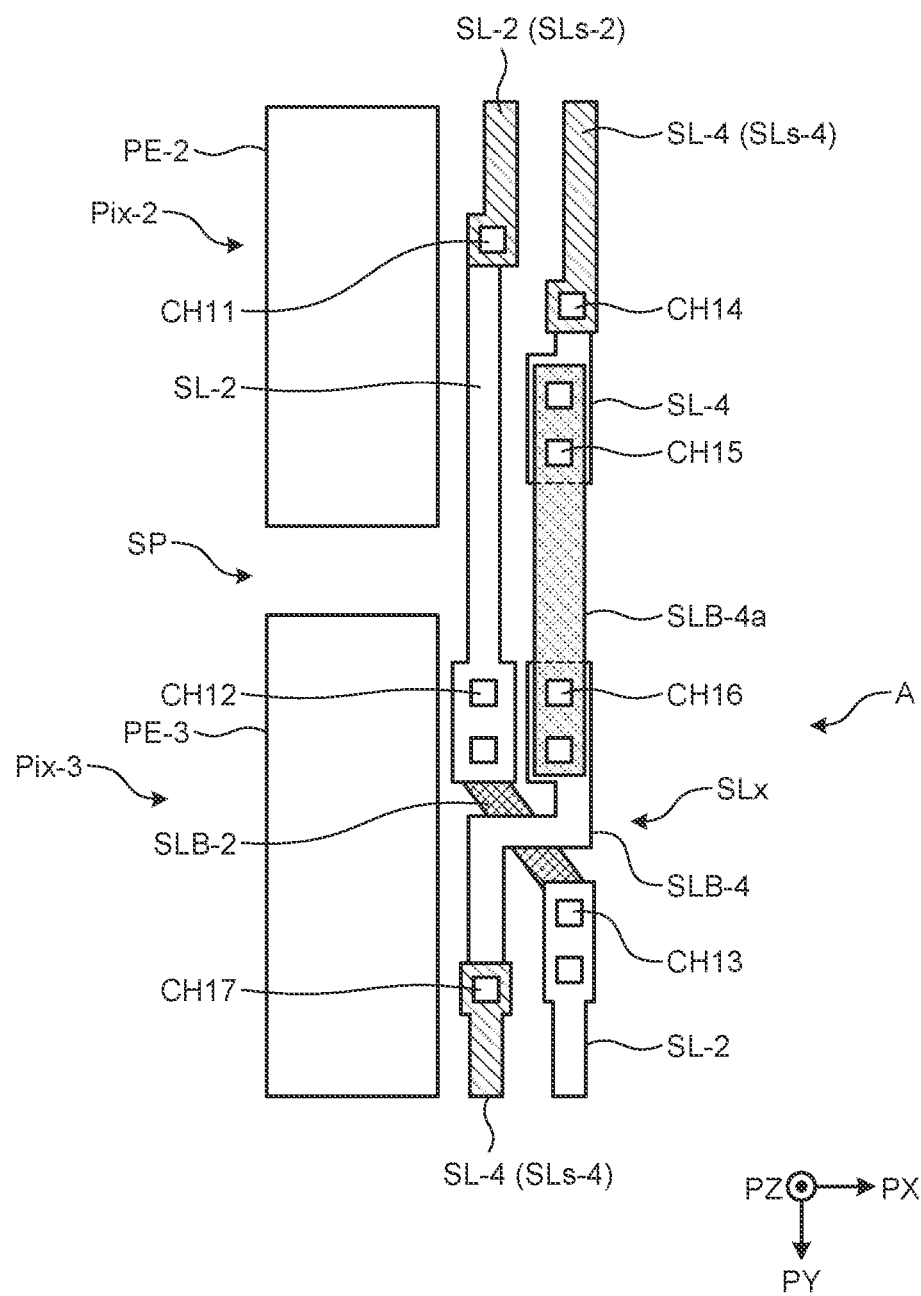
FIG. 18 is a plan view illustrating a schematic enlarged view of an intersection between the signal lines.

FIG. 18 is a plan view illustrating a schematic enlarged view of the intersection between the signal lines. FIG. 18 illustrates the intersection SLx between the second signal line SL-2 and the fourth signal line SL-4 in an area A illustrated in FIG. 10.

As illustrated in FIG. 18, on the second pixel Pix-2 side, the second signal line SL-2 and the fourth signal line SL-4 are arranged in this order in the first direction PX. The order of the arrangement in the first direction PX is interchanged at the intersection SLx, and the fourth signal line SL-4 and the second signal line SL-2 are arranged in this order on the third pixel Pix-3 side.

In more detail, the intersection SLx includes bridge line SLB-2 and bridge line SLB-4 that are provided so as to intersect each other in plan view. At the intersection SLx, an end on the second pixel Pix-2 side of the bridge line SLB-2 is coupled to the second signal line SL-2 arranged on the left side through a contact hole CH12. The bridge line SLB-2 extends in an oblique direction, and an end on the third pixel Pix-3 side of the bridge line SLB-2 is electrically coupled to the second signal line SL-2 arranged on the right side through a contact hole CH13.

At the intersection SLx, an end on the second pixel Pix-2 side of the bridge line SLB-4 is coupled to the fourth signal line SL-4 arranged on the right side through a contact hole CH16 and auxiliary bridge line SLB-4a. The bridge line SLB-4 is provided so as to bend in the first direction PX (leftward in FIG. 18) and intersect the bridge line SLB-2 in plan view. An end on the third pixel Pix-3 side of the bridge line SLB-4 is electrically coupled to the fourth signal line SL-4 arranged on the left side through contact hole CH17.

In the present embodiment, the bridge line SLB-2 is formed in the same layer as that of the scan line GL, using the same material as that of the scan line GL. The bridge line SLB-4 is formed in the same layer as that of the signal line SL, using the same material as that of the signal line SL. That is, the bridge line SLB-2 and the bridge line SLB-4 are insulated from each other by the second insulating film 12 (refer to FIG. 17).

The end on the second pixel Pix-2 side of the bridge line SLB-2 is coupled to the second signal line SL-2. The second signal line SL-2 extends in a single layer across the gap SP and is coupled to the auxiliary signal line SLs-2 through the contact hole CH11. Although not illustrated in any drawing, the second signal line SL-2 is also coupled to the auxiliary signal line SLs-2 on the third pixel Pix-3 side. In FIG. 18, areas where the signal line SL and the auxiliary signal line SLs are stacked are illustrated with hatching.

The end on the second pixel Pix-2 side of the bridge line SLB-4 is coupled to the auxiliary bridge line SLB-4a provided in the same layer as that of the auxiliary gate electrode GEs (refer to FIGS. 16 and 17). The auxiliary bridge line SLB-4a extends across the gap SP and is coupled to the fourth signal line SL-4 through a contact hole CH15. The fourth signal line SL-4 is coupled to the auxiliary signal line SLs-4 through a contact hole CH14 on the second pixel Pix-2 side, and coupled to the auxiliary signal line SLs-4 through the contact hole CH17 on the third pixel Pix-3 side.

Thus, no auxiliary bridge line is provided for the second signal line SL-2 coupled to the bridge line SLB-2 located in the same layer as that of the scan line GL. The fourth signal line SL-4 coupled to the bridge line SLB-4 in the same layer as that of the signal line SL is provided with the auxiliary bridge line SLB-4a in the same layer as that of the auxiliary gate electrode GEs. This configuration can reduce variations in the wiring resistance between the signal lines SL.

While the intersection SLx between the second signal line SL-2 and the fourth signal line SL-4 has been described with reference to FIG. 18, the same configuration can be employed for the intersection SLx between the first signal line SL-1 and the third signal line SL-3. The auxiliary bridge line SLB-4a can be provided at any location. The auxiliary bridge line SLB-4a may be omitted. In that case, the bridge line SLB-4 is provided so as to be continuously integrated with the fourth signal line SL-4.

Second Embodiment

Figure 19:
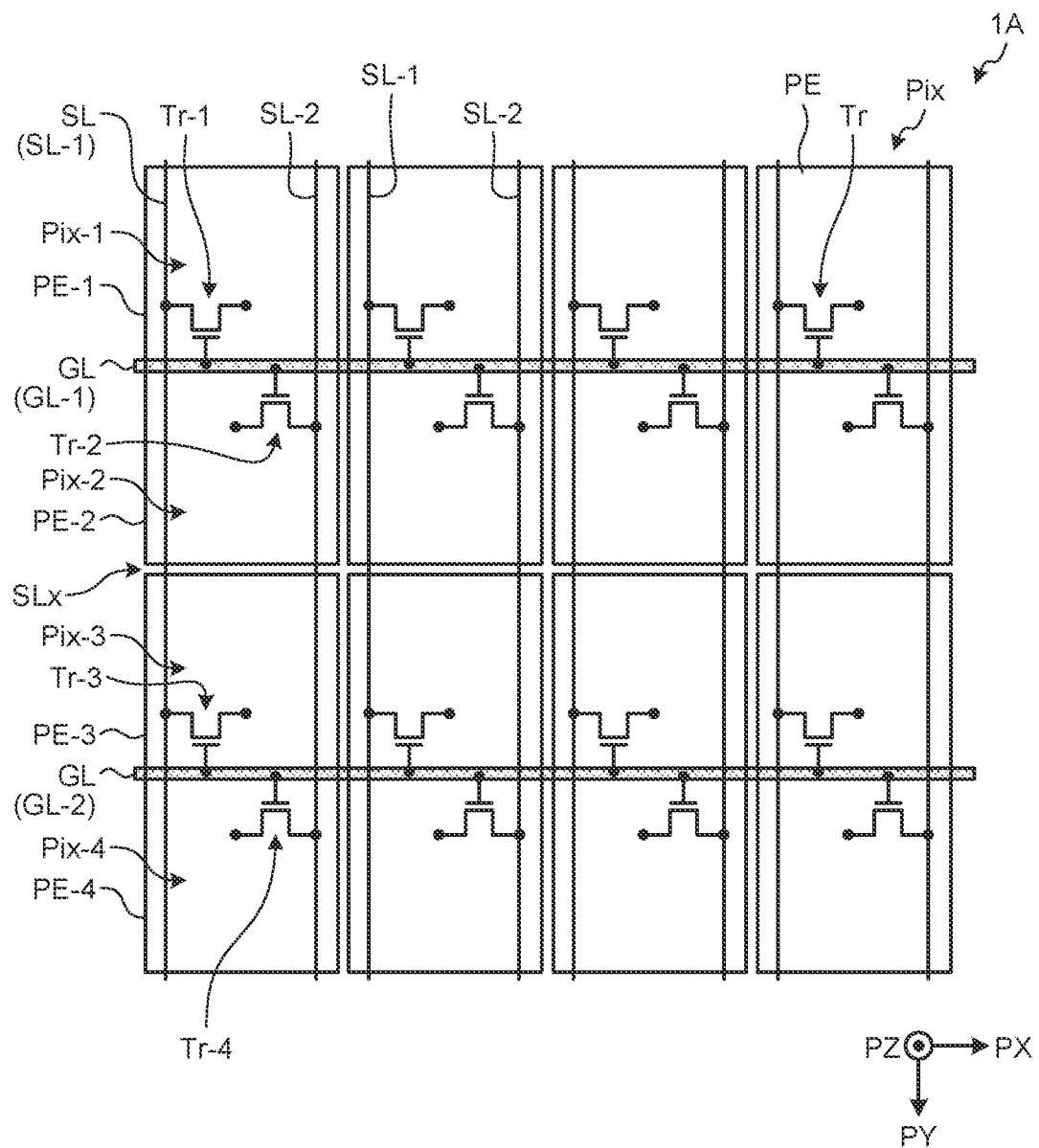
FIG. 19 is a circuit diagram illustrating the pixel array of a display device according to a second embodiment.

FIG. 19 is a circuit diagram illustrating the pixel array of a display device according to a second embodiment. In the following description, the same components as those described in the embodiment above are denoted by the same reference numerals, and the description thereof will not be repeated.

As illustrated in FIG. 19, in a display device 1A according to the second embodiment, two of the signal lines SL are provided for one pixel column. In the same manner as in the first embodiment, the scan lines GL are provided in every other pixel row in the pixels Pix arranged in the second direction PY. The coupling configuration of the scan line GL and each of the pixels Pix is the same as that in the first embodiment described above and will not be described again.

The first signal line SL-1 is provided on the left side of the pixel column (the first pixel Pix-1, the second pixel Pix-2, the third pixel Pix-3, and the fourth pixel Pix-4) and extends in the second direction PY. The second signal line SL-2 is provided on the right side of the pixel column (the first pixel Pix-1, the second pixel Pix-2, the third pixel Pix-3, and the fourth pixel Pix-4) and extends in the second direction PY.

The first signal line SL-1 is electrically coupled to the first pixel electrode PE-1 through the first switching element Tr-1. The first signal line SL-1 is also electrically coupled to the third pixel electrode PE-3 through the third switching element Tr-3. The second signal line SL-2 is electrically coupled to the second pixel electrode PE-2 through the second switching element Tr-2. The second signal line SL-2 is also electrically coupled to the fourth pixel electrode PE-4 through the fourth switching element Tr-4.

In the present embodiment, the gate drive circuit 43 (refer to FIG. 2) sequentially supplies the gate drive signal VGL to the first and the second scan lines GL-1 and GL-2 in a time-divisional manner. This operation sequentially selects two pixel rows coupled to the first scan line GL-1 and two pixel rows coupled to the second scan line GL-2 in a time-division manner.

The source drive circuit 44 (refer to FIG. 2) supplies the gradation signal Vpix to each of the first signal line SL-1 and the second signal line SL-2. This operation simultaneously writes the gradation signal Vpix to the pixels Pix in the selected two rows. The source drive circuit 44 (refer to FIG. 2) sequentially supplies the gradation signal Vpix to each pixel column, that is, to each set of the two signal lines SL (the first signal line SL-1 and the second signal line SL-2) during a period when the gate drive signal VGL is on.

With the above-described configuration, in the second embodiment, the period for writing the gradation signals Vpix to the pixels Pix can be made twice longer than that in a case where the pixel row is sequentially selected for each of the scan lines GL.

Figure 20:
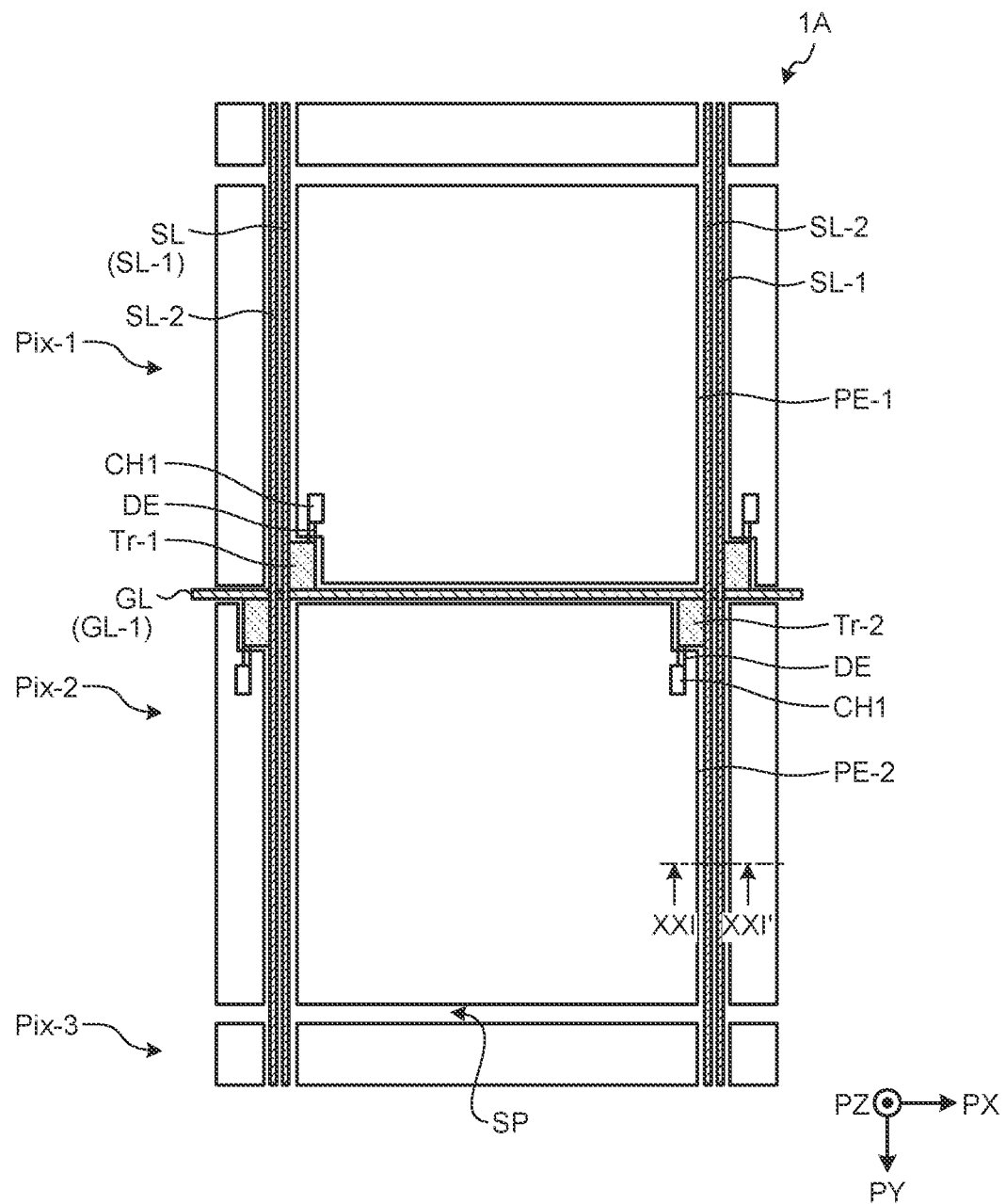
FIG. 20 is a plan view illustrating the scan line, the signal lines, and the switching elements for the pixels according to the second embodiment.

FIG. 20 is a plan view illustrating the scan line, the signal lines, and the switching elements for the pixels according to the second embodiment. As illustrated in FIG. 20, the first pixel electrode PE-1 and the second pixel electrode PE-2 are arranged between the first signal line S1-1 and the second signal line S1-2 in the first direction PX. In FIG. 20, in one pixel column, one first signal line SL-1 is arranged on the left side of the pixel electrode PE, and one second signal line SL-2 is arranged on the right side of the pixel electrode PE. In other words, two of the signal lines SL are collectively arranged between two pixel columns (pixel electrodes PE) adjacent to each other in the first direction PX and each extend in the second direction PY. Of the two signal lines SL arranged collectively, the first signal line SL-1 on the right side is coupled to a pixel column on the right side thereof, and the second signal line SL-2 on the left side is coupled to a pixel column on the left side thereof.

Figure 21:
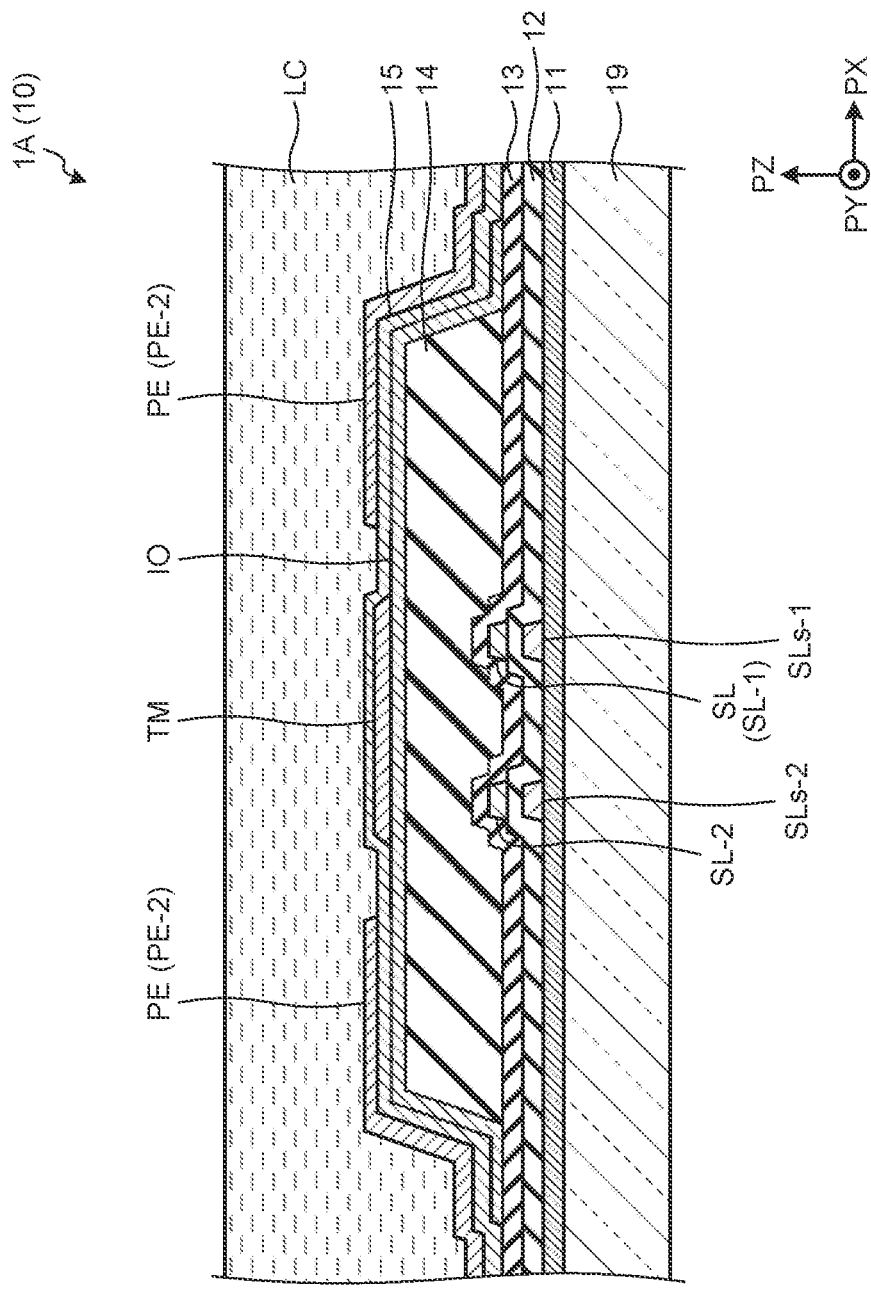
FIG. 21 is a sectional view along XXI-XXI' of FIG. 20.

FIG. 21 is a sectional view along XXI-XXI' of FIG. 20. The multilayered structure of the first to the fifth insulating films 11 to 15, the holding capacitance electrode IO, the metal layer TM, and the pixel electrode PE (second pixel electrode PE-2) illustrated in FIG. 21 is the same as that of the first embodiment described above (refer to FIG. 14) and will not be repeatedly described.

As illustrated in FIG. 21, the auxiliary signal lines SLs-1 and SLs-2 are provided on the first insulating film 11. The second insulating film 12 is provided on the first insulating film 11 so as to cover the auxiliary signal lines SLs-1 and SLs-2. The first and the second signal lines SL-1 and SL-2 are provided on the second insulating film 12. The third insulating film 13 is provided on the second insulating film 12, covering the first signal line SL-1 and the second signal line SL-2. The fourth insulating film 14 is provided in an area overlapping the first and the second signal lines SL-1 and SL-2 and the auxiliary signal lines SLs-1 and SLs-2.

The auxiliary signal lines SLs-1 and SLs-2 extend in the second direction PY in positions that overlap the first and the second signal lines SL-1 and SL-2, respectively. The auxiliary signal lines SLs-1 and SLs-2 are electrically coupled to the auxiliary signal lines SLs-1 and SLs-2 through contact holes (not illustrated) provided at any locations.

In the second embodiment, the numbers of the signal lines SL and the auxiliary signal lines SLs are smaller than those in the first embodiment described above. Consequently, the distance between the pixel electrodes PE adjacent in the first direction PX can be reduced. Alternatively, the width of the fourth insulating film 14 overlapping the signal lines SL and the auxiliary signal lines SLs can be made smaller than that in the first embodiment. The width of the third portion LSc of the light-blocking layer LS (refer to FIG. 13) overlapping the signal line SL can also be reduced. Therefore, the aperture ratio of the light-blocking layer LS can be improved.

Third Embodiment

Figure 22:
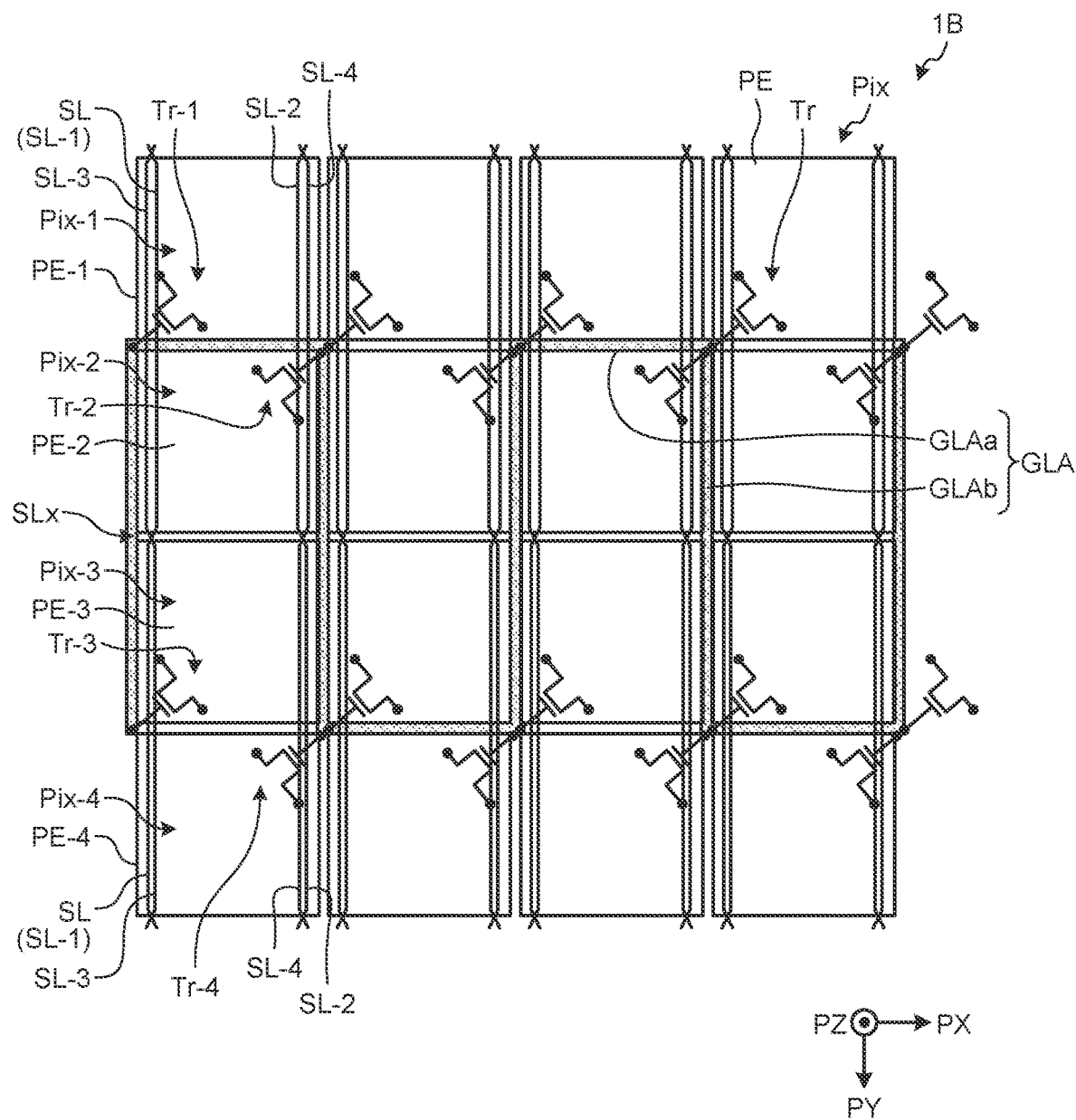
FIG. 22 is a circuit diagram illustrating the pixel array of a display device according to a third embodiment.

FIG. 22 is a circuit diagram illustrating the pixel array of a display device according to a third embodiment. As illustrated in FIG. 22, in a display device 1B according to the third embodiment, a scan line GLA is formed in a meandering shape. Specifically, the scan line GLA includes a first partial scan line GLAa that extends in the first direction PX and a second partial scan line GLAb that extends in the second direction PY. The first partial scan line GLAa is provided between the pixels Pix (pixel electrodes PE) adjacent in the second direction PY. The second partial scan line GLAb is provided between the pixels Pix (pixel electrodes PE) adjacent in the first direction PX. A plurality of the first partial scan lines GLAa and a plurality of the second partial scan lines GLAb are alternately coupled in the first direction PX to form the scan line GLA into a meandering shape.

Each of the first partial scan lines GLAa has a length of one pixel in the first direction PX. Each of the second partial scan lines GLAb has a length of two pixels in the second direction PY. This configuration allows one scan line GLA to be coupled to four pixel rows.

The following describes a coupling configuration of the scan line GLA to each of the pixels Pix by exemplifying one pixel column (the first pixel Pix-1, the second pixel Pix-2, the third pixel Pix-3, and the fourth pixel Pix-4) in FIG. 22.

The gate of the first switching element Tr-1 of the first pixel Pix-1 is coupled to the scan line GLA near a coupling portion between one end side of the second partial scan line GLAb arranged on the left side of the pixel column and the left end side of the first partial scan line GLAa. The source of the first switching element Tr-1 of the first pixel Pix-1 is coupled to the first signal line SL-1.

The gate of the second switching element Tr-2 of the second pixel Pix-2 is coupled to the scan line GLA near a coupling portion between one end side of the second partial scan line GLAb arranged on the right side of the pixel column and the right end side of the first partial scan line GLAa. The source of the second switching element Tr-2 of the second pixel Pix-2 is coupled to the second signal line SL-2.

The gate of the third switching element Tr-3 of the third pixel Pix-3 is coupled to the scan line GLA near a coupling portion between the other end side of the second partial scan line GLAb arranged on the left side of the pixel column and the right end side of the first partial scan line GLAa. The source of the third switching element Tr-3 of the third pixel Pix-3 is coupled to the third signal line SL-3.

The gate of the fourth switching element Tr-4 of the fourth pixel Pix-4 is coupled to the scan line GLA near a coupling portion between the other end side of the second partial scan line GLAb arranged on the right side of the pixel column and the left end side of the first partial scan line GLAa. The source of the fourth switching element Tr-4 of the fourth pixel Pix-4 is coupled to the fourth signal line SL-4.

With the above-described configuration, when the gate drive signal VGL is supplied to the one meandering-shaped scan line GLA, the first to the fourth switching elements Tr-1 to Tr-4 are turned on, and thus, the four pixel rows are simultaneously selected.

Figure 23:
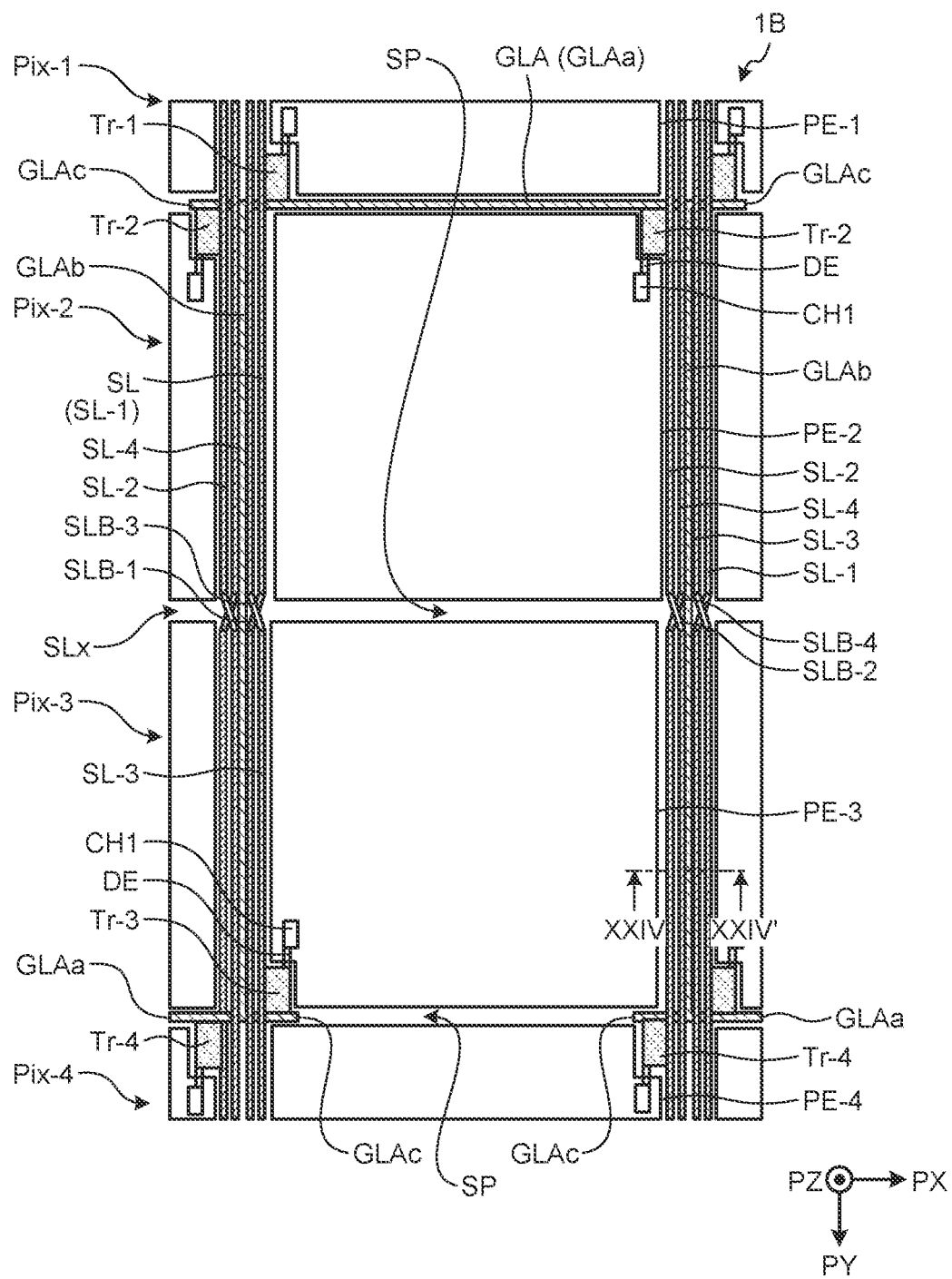
FIG. 23 is a plan view illustrating a scan line, the signal lines, and the switching elements for the pixels according to the third embodiment.

FIG. 23 is a plan view illustrating the scan line, the signal lines, and the switching elements for the pixels according to the third embodiment. FIG. 23 illustrates an enlarged view of the second pixel Pix-2 and the third pixel Pix-3 in FIG. 22. As illustrated in FIG. 23, the first partial scan line GLAa is provided between the first and the second pixel electrodes PE-1 and PE-2 adjacent in the second direction PY. The second and the third pixel electrodes PE-2 and PE-3 are adjacent to each other in the second direction PY with the gap SP interposed therebetween. The third and the fourth pixel electrodes PE-3 and PE-4 are adjacent to each other in the second direction PY with the gap SP interposed therebetween.

The second partial scan line GLAb is provided between two pixel columns (pixel electrodes PE) adjacent in the first direction PX. In more detail, one of the second partial scan lines GLAb is provided between two pairs of signal lines: a pair of two signal lines (the second signal line SL-2 and the fourth signal line SL-4) and a pair of two signal lines (the first signal line SL-1 and the third signal line SL-3), between the two pixel columns (pixel electrodes PE) adjacent in the first direction PX. In other words, in one pixel column, the second and the third pixel electrodes PE-2 and PE-3 are located between the two of the second partial scan lines GLAb in the first direction PX.

The scan line GLA further includes a third partial scan line GLAc. The third partial scan line GLAc is provided at the coupling portion between the first partial scan line GLAa and the second partial scan line GLAb and extends in the first direction PX such that the first partial scan line GLAa and the third partial scan line GLAc are on opposite sides in the first direction PX. The third partial scan lines GLAc are provided on each of the left and right end sides of the first partial scan line GLAa and extends to the adjacent pixel column.

With this configuration, in the example illustrated in FIG. 23, the gate of the first switching element Tr-1 of the first pixel Pix-1 is coupled to the first partial scan line GLAa. In the same pixel column, the gate of the second switching element Tr-2 of the second pixel Pix-2 is coupled to the first partial scan line GLAa common to the first switching element Tr-1. In the pixel column adjacent to the left side of FIG. 23, the gate of the second switching element Tr-2 of the second pixel Pix-2 that is obliquely adjacent to the first switching element Tr-1 is coupled to the third partial scan line GLAc.

The gate of the third switching element Tr-3 of the third pixel Pix-3 is coupled to the third partial scan line GLAc that extends rightward from a coupling portion between the second partial scan line GLAb provided on the left side of the third pixel Pix-3 and the first partial scan line GLAa. The gate of the fourth switching element Tr-4 of the fourth pixel Pix-4 is coupled to the third partial scan line GLAc that extends leftward from a coupling portion between the second partial scan line GLAb provided on the right side of the third pixel Pix-3 and the first partial scan line GLAa.

Thus, the scan line GLA is formed in a meandering shape, and the first partial scan line GLAa extending in the first direction PX is provided one for four pixel rows. That is, compared with each of the embodiments described above, a large number of the pixel electrodes PE (pixels Pix) are provided with no first partial scan line GLAa and adjacent to one another with the gap SP interposed therebetween. Even in this case, since the third partial scan lines GLAc are provided, each of the switching elements Tr is provided so as to be capable of being well coupled to the meandering-shaped scan line GLA.

Figure 24:
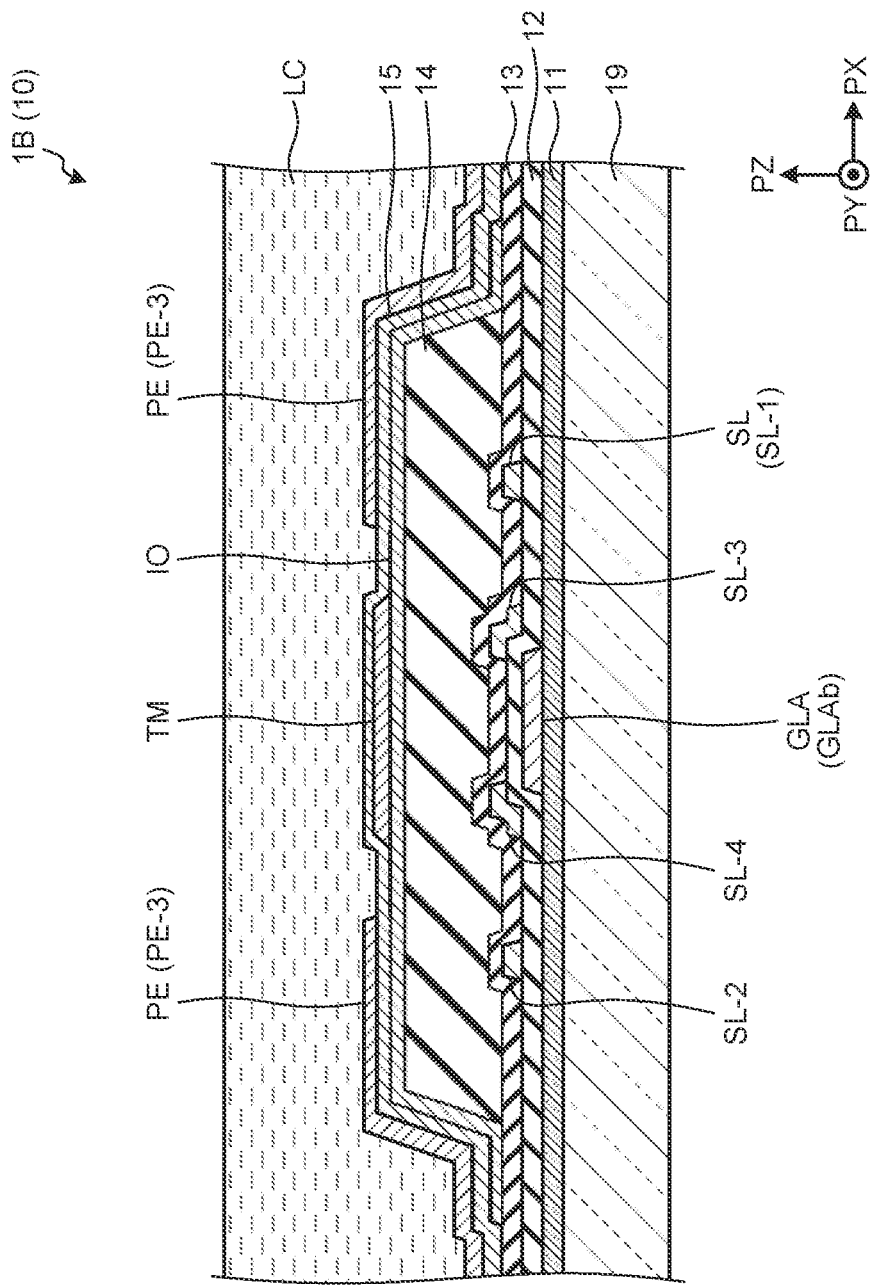
FIG. 24 is a sectional view along XXIV-XXIV' of FIG. 23.

FIG. 24 is a sectional view along XXIV-XXIV' of FIG. 23. The multilayered structure of the first to the fifth insulating films 11 to 15, the holding capacitance electrode IO, the metal layer TM, and the pixel electrode PE (third pixel electrode PE-3) is the same as that of the first embodiment described above (refer to FIG. 14) and will not be repeatedly described.

As illustrated in FIG. 24, the scan line GLA (second partial scan line GLAb) is provided on the first insulating film 11. The second insulating film 12 is provided on the first insulating film 11 so as to cover the scan line GLA (second partial scan line GLAb). The signal lines SL are provided on the second insulating film 12.

In more detail, the second partial scan line GLAb is located between two pairs of signal lines SL: a pair of two signal lines SL (the second signal line SL-2 and the fourth signal line SL-4) and a pair of two signal lines SL (the third signal line SL-3 and the first signal line SL-1). The fourth signal line SL-4 is provided so as to overlap one edge of the second partial scan line GLAb in the first direction PX (left side in FIG. 24). The third signal line SL-3 is provided so as to overlap the other edge of the second partial scan line GLAb in the first direction PX (right side in FIG. 24).

The scan line GLA (second partial scan line GLAb) has a width larger than that of each of the signal lines SL and smaller than that of the metal layer TM. The scan line GLA (second partial scan line GLAb) has a larger width than that of the scan line GL of the first embodiment described above (refer to FIG. 15). As a result, the wiring resistance of the scan line GLA can be restrained from increasing even in the configuration where the scan line GLA is formed in a meandering shape, and the overall length of the wiring including the first partial scan lines GLAa and the second partial scan lines GLAb is long.

As described above, the third embodiment can reduce the number of wiring lines extending in the first direction PX (first partial scan lines GLAa) in the scan line GLA to approximately a half that of the first and the second embodiments described above. Alternatively, the third embodiment can reduce the number of the wiring lines extending in the first direction PX (first partial scan line GLAa) to approximately a quarter that of the configuration where the scan line GL is provided for each of the pixels Pix arranged in the second direction PY. As a result, the light traveling in the display panel 2 along the second direction PY can be restrained from being reflected or scattered by the scan lines GLA provided in the array substrate 10.

Fourth Embodiment

Figure 25:
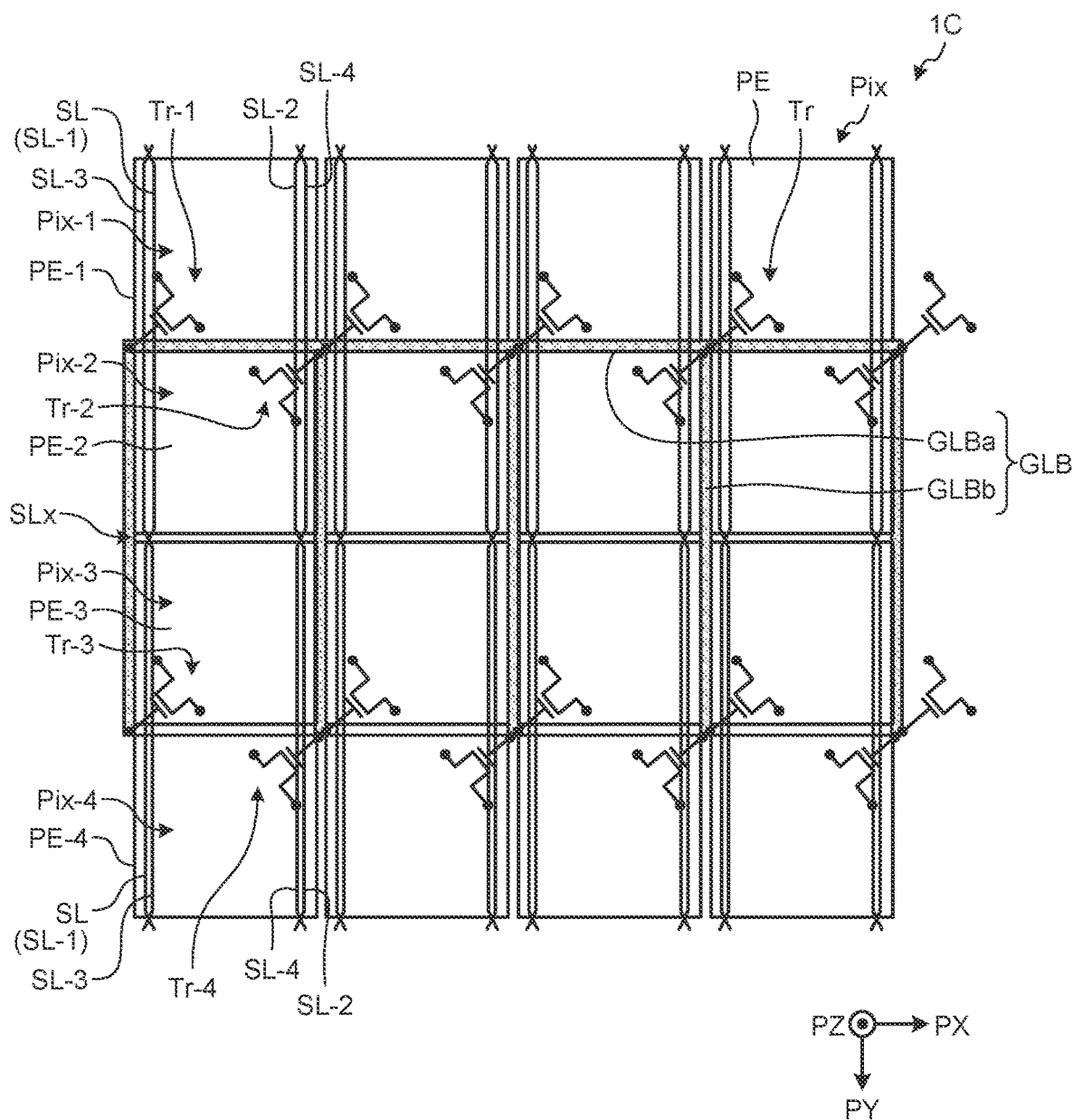
FIG. 25 is a circuit diagram illustrating the pixel array of a display device according to a fourth embodiment.

FIG. 25 is a circuit diagram illustrating the pixel array of a display device according to a fourth embodiment. As illustrated in FIG. 25, in a display device 1C according to the fourth embodiment, a scan line GLB is formed in a pectinate shape. Specifically, the scan line GLB includes a first partial scan line GLBa extending in the first direction PX and a second partial scan line GLBb extending in the second direction PY. The first partial scan line GLBa is provided between the pixels Pix (pixel electrodes PE) arranged in the second direction PY and is continuously provided over the pixels Pix arranged in the first direction PX. A plurality of the second partial scan lines GLBb are arranged in the first direction PX and are each provided between the pixels Pix (pixel electrodes PE) adjacent in the first direction PX. One end side in the second direction PY of each of the second partial scan lines GLBb is coupled to the first partial scan line GLBa common thereto.

The first partial scan line GLBa is continuously provided over one pixel row in the first direction PX. The second partial scan lines GLBb each have a length of two pixels in the second direction PY. This configuration allows the scan line GLB to be coupled to four pixel rows.

Specifically, for one pixel column, the gate of the first switching element Tr-1 of the first pixel Pix-1 is coupled to the scan line GLB near a coupling portion between one end side of the second partial scan line GLBb arranged on the left side of the pixel column and the first partial scan line GLBa. The source of the first switching element Tr-1 of the first pixel Pix-1 is coupled to the first signal line SL-1.

The gate of the second switching element Tr-2 of the second pixel Pix-2 is coupled to the scan line GLB near a coupling portion between one end side of the second partial scan line GLBb arranged on the right side of the pixel column and the first partial scan line GLBa. The source of the second switching element Tr-2 of the second pixel Pix-2 is coupled to the second signal line SL-2.

On the other end side of the second partial scan line GLBb arranged on the left side of the pixel column, the gate of the third switching element Tr-3 of the third pixel Pix-3 is coupled to the scan line GLB. The source of the third switching element Tr-3 of the third pixel Pix-3 is coupled to the third signal line SL-3.

On the other end side of the second partial scan line GLBb arranged on the right side of the pixel column, the gate of the fourth switching element Tr-4 of the fourth pixel Pix-4 is coupled to the scan line GLB. The source of the fourth switching element Tr-4 of the fourth pixel Pix-4 is coupled to the fourth signal line SL-4.

With the above-described configuration, when the gate drive signal VGL is supplied to the one pectinate-shaped scan line GLB, the first to the fourth switching elements Tr-1 to Tr-4 are turned on, and thus, the four pixel rows are simultaneously selected.

Figure 26:
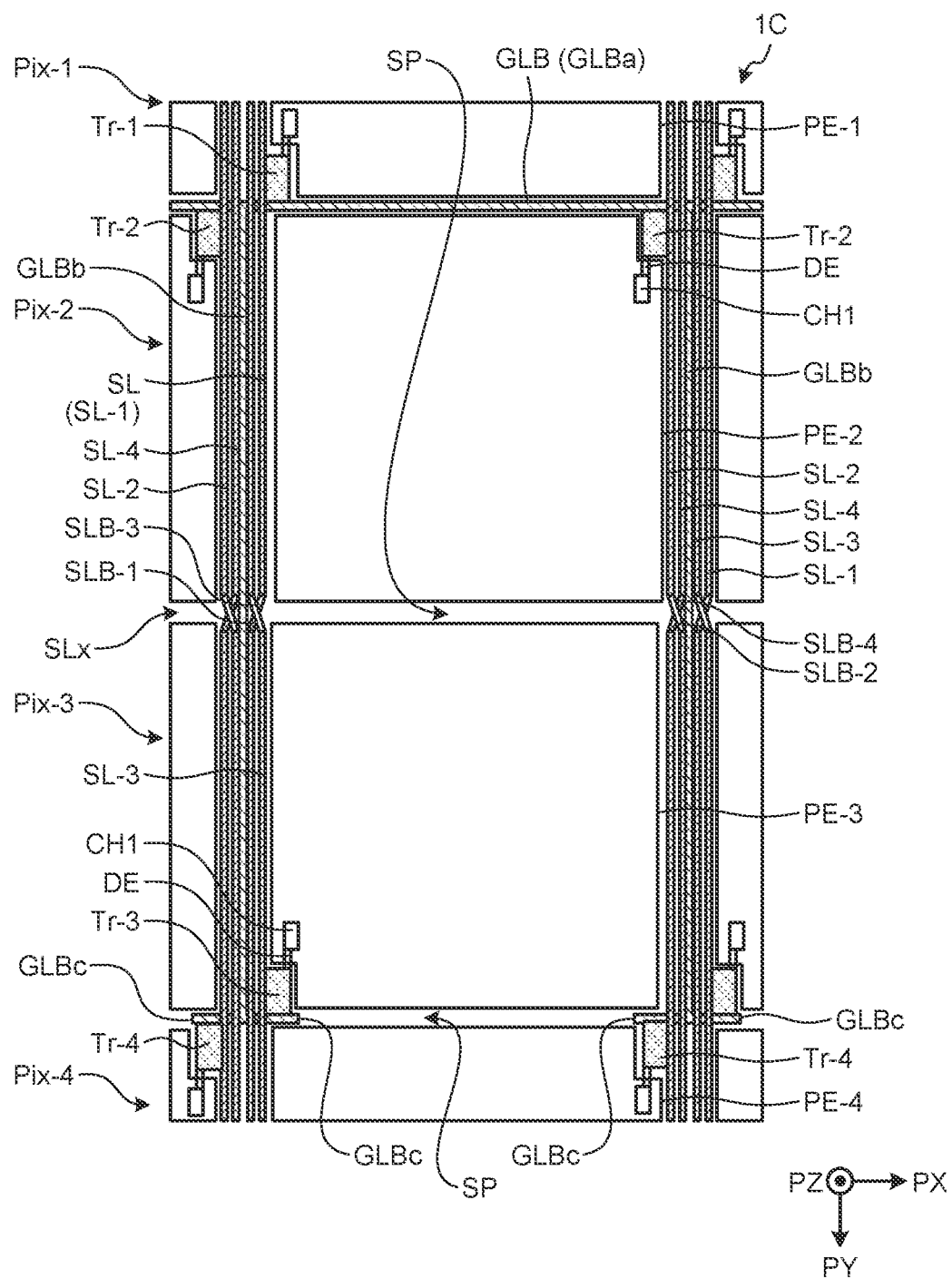
FIG. 26 is a plan view illustrating a scan line, the signal lines, and the switching elements for the pixels according to the fourth embodiment.

FIG. 26 is a plan view illustrating the scan line, the signal lines, and the switching elements for the pixels according to the fourth embodiment. FIG. 26 illustrates an enlarged view of the second pixel Pix-2 and the third pixel Pix-3 in FIG. 25. As illustrated in FIG. 26, the first partial scan line GLBa is provided between the first and the second pixel electrodes PE-1 and PE-2 adjacent in the second direction PY. The second and the third pixel electrodes PE-2 and PE-3 are adjacent to each other in the second direction PY with the gap SP interposed therebetween. The third and the fourth pixel electrodes PE-3 and PE-4 are adjacent to each other in the second direction PY with the gap SP interposed therebetween.

The second partial scan line GLBb is provided between two pixel columns (pixel electrodes PE) adjacent in the first direction PX. In more detail, one of the second partial scan lines GLBb is provided between two pairs of signal lines: a pair of two signal lines (the second signal line SL-2 and the fourth signal line SL-4) and a pair of two signal lines (the first signal line SL-1 and the third signal line SL-3) between the two pixel columns (pixel electrodes PE) adjacent in the first direction PX. In one pixel column, the second and the third pixel electrodes PE-2 and PE-3 are located between two of the second partial scan lines GLBb in the first direction PX.

The multilayered structure of the second partial scan line GLBb and the signal lines SL is similar to that of the second embodiment described with reference to FIG. 24, and is not illustrated.

The scan line GLB further includes a third partial scan line GLBc. The third partial scan line GLBc is provided on the other end side of the second partial scan line GLBb (an end thereof on a side opposite to the first partial scan line GLBa) and extends in the first direction PX. The third partial scan line GLBc extends to each of the pixel columns adjacent on the left and right sides to the second partial scan line GLBb.

With the above-described configuration, in the example illustrated in FIG. 26, the gate of the first switching element Tr-1 of the first pixel Pix-1 is coupled to the first partial scan line GLBa. In the same pixel column, the gate of the second switching element Tr-2 of the second pixel Pix-2 is coupled to the first partial scan line GLBa common to the first switching element Tr-1.

The gate of the third switching element Tr-3 of the third pixel Pix-3 is coupled to the third partial scan line GLBc that extends rightward from the second partial scan line GLBb provided on the left side of the third pixel Pix-3. The gate of the fourth switching element Tr-4 of the fourth pixel Pix-4 is coupled to the third partial scan line GLBc that extends leftward from the second partial scan line GLBb provided on the right side of the third pixel Pix-3.

Thus, the scan line GLB is formed in a pectinate shape, and the first partial scan line GLBa extending in the first direction PX is provided one for four pixel rows. Even in each of the pixel electrodes PE (pixels Pix) that are provided with no first partial scan line GLBa and are adjacent to each other with the gap SP interposed therebetween, a corresponding one of the switching elements Tr is provided so as to be capable of being well coupled to the scan line GLB because the third partial scan line GLBc is provided.

The configuration of each of the embodiments described above is merely exemplary and can be changed as appropriate. For example, the third and the fourth embodiments have illustrated the configurations where one scan line GLA and one scan line GLB, respectively, are each coupled to four pixel rows, but the present disclosure is not limited to these configurations. The one scan line GLA and the one scan line GLB may each be coupled to three, or five or more pixel rows.

For the fourth insulating film 14 serving as a grid-shaped organic insulating film, the structure has been disclosed in which the fourth insulating film 14 inside the grid shape is totally removed to expose the third insulating film 13 and other components in the lower layer, but the structure is not limited to thereto. For example, the structure may be such that a portion of the fourth insulating film 14 is left so as to be remained thin inside the grid-shaped areas surrounded by the signal lines SL and the scan lines GL using a halftone exposure technique. This structure makes the fourth insulating film 14 inside the grid-shaped areas thinner than that of the grid-shaped areas surrounded by the signal lines SL and the scan lines GL.

While the preferred embodiments of the present disclosure have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A display device comprising:
a first light-transmitting substrate;
a second light-transmitting substrate that faces the first light-transmitting substrate;
a liquid crystal layer that is disposed between the first light-transmitting substrate and the second light-transmitting substrate and comprises polymer-dispersed liquid crystals;
a plurality of scan lines that are provided to the first light-transmitting substrate and extend along a first direction;
a plurality of signal lines that extend in a second direction intersecting the first direction;
a first pixel electrode and a second pixel electrode that are arranged in the second direction;
a first switching element electrically coupled to the first pixel electrode and a second switching element electrically coupled to the second pixel electrode;
a third pixel electrode and a third switching element electrically coupled to the third pixel electrode; and
a light-blocking layer disposed so as to overlap the scan lines and the signal lines,
wherein
one of the scan lines is arranged between the first pixel electrode and the second pixel electrode in the second direction and is electrically coupled to the first switching element of the first pixel electrode and the second switching element of the second pixel electrode,
the second pixel electrode and the third pixel electrode are arranged in the second direction with a gap interposed between the second pixel electrode and the third pixel electrode,
none of the scan lines is provided between the second pixel electrode and the third pixel electrode,
the light-blocking layer comprises a first portion that extends in the first direction so as to overlap the scan line and a second portion that extends in the first direction so as to overlap the gap between the second pixel electrode and the third pixel electrode, and
a width in the second direction of the second portion of the light-blocking layer is smaller than a width in the second direction of the first portion.

2. A display device comprising:
a first light-transmitting substrate;
a second light-transmitting substrate that faces the first light-transmitting substrate;
a liquid crystal layer that is disposed between the first light-transmitting substrate and the second light-transmitting substrate and comprises polymer-dispersed liquid crystals;
a plurality of scan lines that are provided to the first light-transmitting substrate and extend along a first direction;
a plurality of signal lines that extend in a second direction intersecting the first direction;
a first pixel electrode and a second pixel electrode that are arranged in the second direction;
a first switching element electrically coupled to the first pixel electrode and a second switching element electrically coupled to the second pixel electrode;
a third pixel electrode and a third switching element electrically coupled to the third pixel electrode; and
a grid-shaped organic insulating film that covers the scan lines and the signal lines, along the scan lines and the signal lines,
wherein
one of the scan lines is arranged between the first pixel electrode and the second pixel electrode in the second direction and is electrically coupled to the first switching element of the first pixel electrode and the second switching element of the second pixel electrode,
the second pixel electrode and the third pixel electrode are arranged in the second direction with a gap interposed between the second pixel electrode and the third pixel electrode,
none of the scan lines is provided between the second pixel electrode and the third pixel electrode, and
the organic insulating film is provided so as to cover the gap between the second pixel electrode and the third pixel electrode.

3. The display device according to claim 1, wherein
each of the first switching element and the second switching element comprises a semiconductor layer, a source electrode, a drain electrode, and a gate electrode, and
the first switching element and the second switching element are located on opposite sides in the second direction with respect to the scan line.

4. The display device according to claim 1, comprising a plurality of pixel electrodes arranged in a matrix having a row-column configuration, wherein
the scan line comprises a plurality of first partial scan lines provided between the pixel electrodes adjacent in the second direction and a plurality of second partial scan lines provided between the pixel electrodes adjacent in the first direction, and
the scan line is formed in a meandering shape by alternately coupling the first partial scan lines and the second partial scan lines in the first direction.

5. The display device according to claim 1, comprising a plurality of pixel electrodes arranged in a matrix having a row-column configuration, wherein
the scan line comprises a first partial scan line that is provided between the pixel electrodes adjacent in the second direction and extends along the pixel electrodes arranged in the first direction, and a plurality of second partial scan lines provided between the pixel electrodes adjacent in the first direction, and
the second partial scan lines are coupled to the first partial scan line that is common thereto, and are arranged in the first direction.

6. The display device according to claim 1, comprising:
a first signal line electrically coupled to the first pixel electrode; and
a second signal line electrically coupled to the second pixel electrode adjacent in the second direction to the first pixel electrode, wherein
the first pixel electrode and the second pixel electrode are arranged between the first signal line and the second signal line in the first direction.

7. The display device according to claim 1, further comprising a fourth pixel electrode, wherein
the first pixel electrode, the second pixel electrode, the third pixel electrode, and the fourth pixel electrode are arranged in the second direction in the order as listed,
the display device comprises a first signal line, a second signal line, a third signal line, and a fourth signal line that are electrically coupled to the first pixel electrode, the second pixel electrode, the third pixel electrode, and the fourth pixel electrode, respectively, and
the first pixel electrode, the second pixel electrode, the third pixel electrode, and the fourth pixel electrode are arranged between two signal lines and other two signal lines among the first signal line, the second signal line, the third signal line, and the fourth signal in the first direction.

8. The display device according to claim 2, wherein
each of the first switching element and the second switching element comprises a semiconductor layer, a source electrode, a drain electrode, and a gate electrode, and
the first switching element and the second switching element are located on opposite sides in the second direction with respect to the scan line.

9. The display device according to claim 2, comprising a plurality of pixel electrodes arranged in a matrix having a row-column configuration, wherein
the scan line comprises a plurality of first partial scan lines provided between the pixel electrodes adjacent in the second direction and a plurality of second partial scan lines provided between the pixel electrodes adjacent in the first direction, and
the scan line is formed in a meandering shape by alternately coupling the first partial scan lines and the second partial scan lines in the first direction.

10. The display device according to claim 2, comprising a plurality of pixel electrodes arranged in a matrix having a row-column configuration, wherein
the scan line comprises a first partial scan line that is provided between the pixel electrodes adjacent in the second direction and extends along the pixel electrodes arranged in the first direction, and a plurality of second partial scan lines provided between the pixel electrodes adjacent in the first direction, and
the second partial scan lines are coupled to the first partial scan line that is common thereto, and are arranged in the first direction.

11. The display device according to claim 2, comprising:
a first signal line electrically coupled to the first pixel electrode; and
a second signal line electrically coupled to the second pixel electrode adjacent in the second direction to the first pixel electrode, wherein
the first pixel electrode and the second pixel electrode are arranged between the first signal line and the second signal line in the first direction.

12. The display device according to claim 2, further comprising a fourth pixel electrode, wherein
- the first pixel electrode, the second pixel electrode, the third pixel electrode, and the fourth pixel electrode are arranged in the second direction in the order as listed,
- the display device comprises a first signal line, a second signal line, a third signal line, and a fourth signal line that are electrically coupled to the first pixel electrode, the second pixel electrode, the third pixel electrode, and the fourth pixel electrode, respectively, and
- the first pixel electrode, the second pixel electrode, the third pixel electrode, and the fourth pixel electrode are arranged between two signal lines and other two signal lines among the first signal line, the second signal line, the third signal line, and the fourth signal in the first direction.

* * * * *